(12) United States Patent
Kim

(10) Patent No.: US 11,114,093 B2
(45) Date of Patent: Sep. 7, 2021

(54) INTELLIGENT VOICE RECOGNIZING METHOD, APPARATUS, AND INTELLIGENT COMPUTING DEVICE

(71) Applicant: LG ELECTRONICS INC., Seoul (KR)

(72) Inventor: Wonchul Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 140 days.

(21) Appl. No.: 16/555,659

(22) Filed: Aug. 29, 2019

(65) Prior Publication Data

US 2019/0385600 A1 Dec. 19, 2019

(30) Foreign Application Priority Data

Aug. 12, 2019 (KR) .................. 10-2019-0098172

(51) Int. Cl.
*G10L 15/20* (2006.01)
*H04W 72/12* (2009.01)
(Continued)

(52) U.S. Cl.
CPC .............. *G10L 15/20* (2013.01); *G10L 15/16* (2013.01); *G10L 15/22* (2013.01);
(Continued)

(58) Field of Classification Search
CPC ......... G10L 15/20; G10L 15/16; G10L 15/22; G10L 21/0232; G10L 25/84; H04W 72/1268
See application file for complete search history.

(56) References Cited

U.S. PATENT DOCUMENTS 9,953,650 B1* 4/2018 Falevsky .................. G06F 3/011
10,714,072 B1* 7/2020 Bodon .................. H04R 1/1041
(Continued)

FOREIGN PATENT DOCUMENTS

KR 10-2019-0047445 A 5/2019
KR 10-2019-0093528 A 8/2019

OTHER PUBLICATIONS

Wang et al., "Supervised Speech Separation Based on Deep Learning: An Overview", IEEE/ACM Transactions on Audio, Speech, and Language Processing, vol. 26, No. 10, Oct. 2018, pp. 1702-1726.

*Primary Examiner* — Mohammad K Islam
(74) *Attorney, Agent, or Firm* — Birch, Stewart, Kolasch & Birch, LLP

(57) ABSTRACT

An intelligent voice recognition method, voice recognition apparatus and intelligent computing device are disclosed. An intelligent voice recognition method according to an embodiment of the present invention obtains a microphone detection signal, recognizes a voice of a user from the microphone detection signal and outputs a response related to the voice on the basis of a result of recognition of the voice, wherein the microphone detection signal includes noise, and a microphone detection signal including only the voice obtained by removing the noise from the microphone detection signal is recognized. Accordingly, only a voice of a user can be effectively separated from a microphone detection signal detected through a microphone of the voice recognition apparatus. One or more of the voice recognition devices, intelligent computing devices, and servers of the present invention may include artificial intelligence modules, drones (Unmanned Aerial Vehicles, UAVs), robots, Augmented Reality (AR) devices, and virtual reality (VR) devices, devices related to 5G services, and the like.

20 Claims, 30 Drawing Sheets

(51) Int. Cl.
*G10L 25/84* (2013.01)
*G10L 15/16* (2006.01)
*G10L 15/22* (2006.01)
*G10L 21/0232* (2013.01)

(52) U.S. Cl.
CPC .......... *G10L 21/0232* (2013.01); *G10L 25/84* (2013.01); *H04W 72/1268* (2013.01)

(56) References Cited

U.S. PATENT DOCUMENTS

| | | | |
|---|---|---|---|
| 10,748,529 B1* | 8/2020 | Milden | G10L 15/22 |
| 10,764,534 B1* | 9/2020 | Shevchenko | G06F 40/253 |
| 10,831,442 B2* | 11/2020 | Fox | G10L 15/28 |
| 10,923,111 B1* | 2/2021 | Fan | G10L 15/02 |
| 2015/0287406 A1* | 10/2015 | Kristjansson | G10L 21/0232 704/233 |
| 2017/0064427 A1* | 3/2017 | Rich | H04R 1/1025 |
| 2017/0133000 A1* | 5/2017 | Hendrix | G10K 11/17854 |
| 2018/0174580 A1* | 6/2018 | Kim | G10L 15/197 |
| 2018/0268837 A1* | 9/2018 | Ganeshkumar | G10L 21/0216 |
| 2018/0350381 A1* | 12/2018 | Bryan | G10L 21/0272 |
| 2019/0027135 A1* | 1/2019 | Kim | G10L 15/22 |
| 2019/0205340 A1* | 7/2019 | Jhawar | G10L 15/22 |
| 2019/0206403 A1* | 7/2019 | Jeong | G06F 3/167 |
| 2020/0020334 A1* | 1/2020 | Kang | G10L 15/22 |
| 2020/0146097 A1* | 5/2020 | Haartsen | H04W 52/0254 |
| 2020/0152181 A1* | 5/2020 | Woo | G06F 3/041 |
| 2020/0286474 A1* | 9/2020 | Shoop | G10L 15/22 |
| 2020/0286475 A1* | 9/2020 | Ji | G10L 25/66 |
| 2020/0336846 A1* | 10/2020 | Rohde | G10L 25/78 |
| 2020/0374269 A1* | 11/2020 | Lidman | G10L 15/30 |
| 2021/0044889 A1* | 2/2021 | Liu | H04R 1/1075 |

* cited by examiner

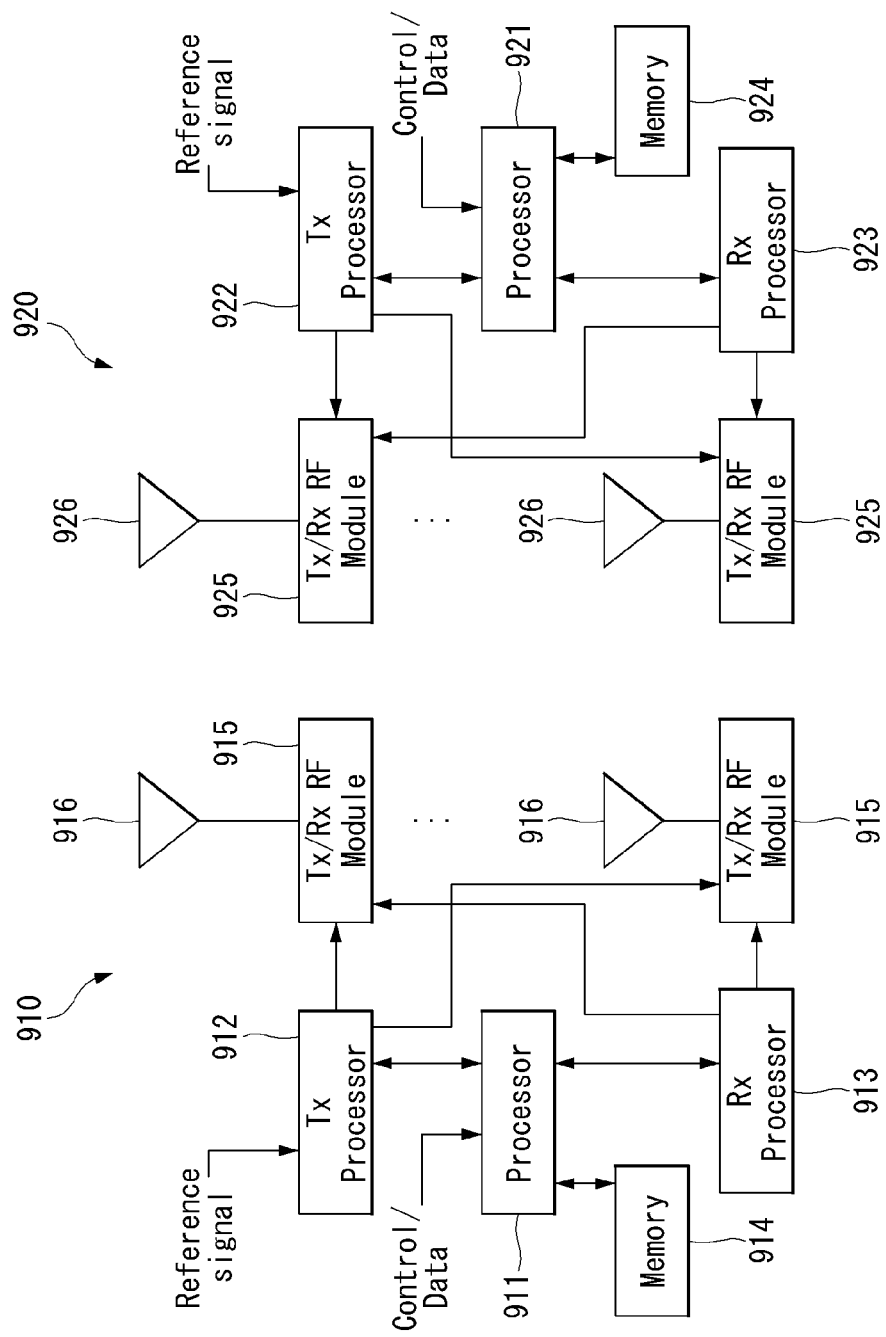
[FIG. 1]

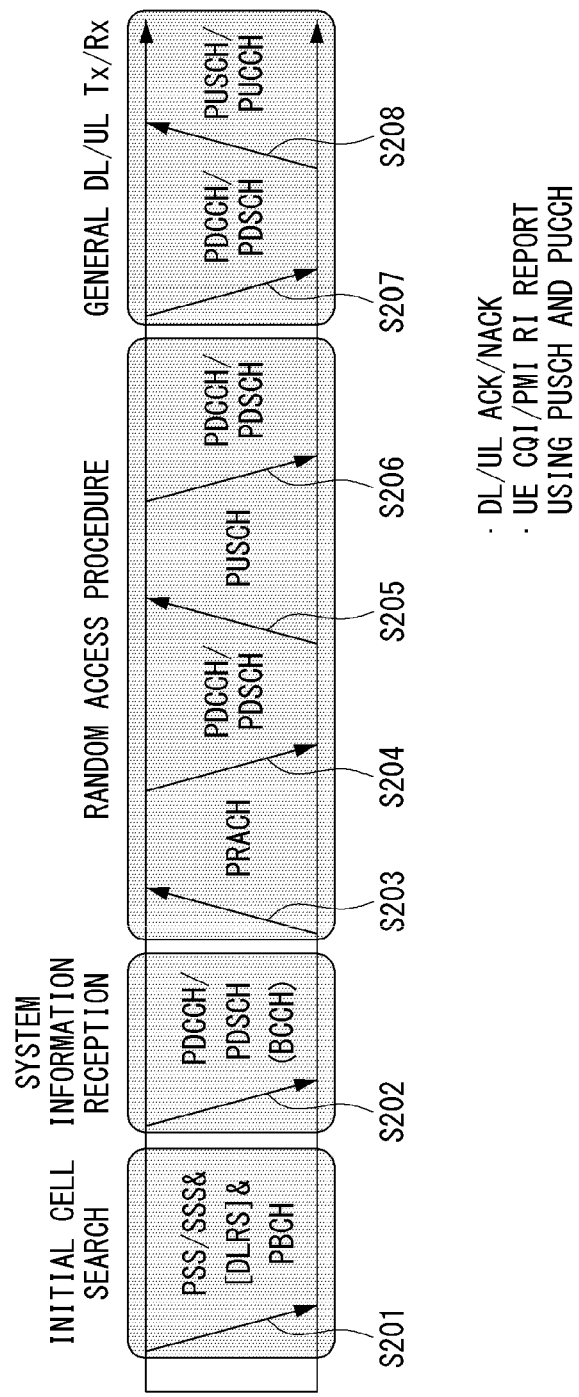
[FIG. 2]

[FIG. 3]
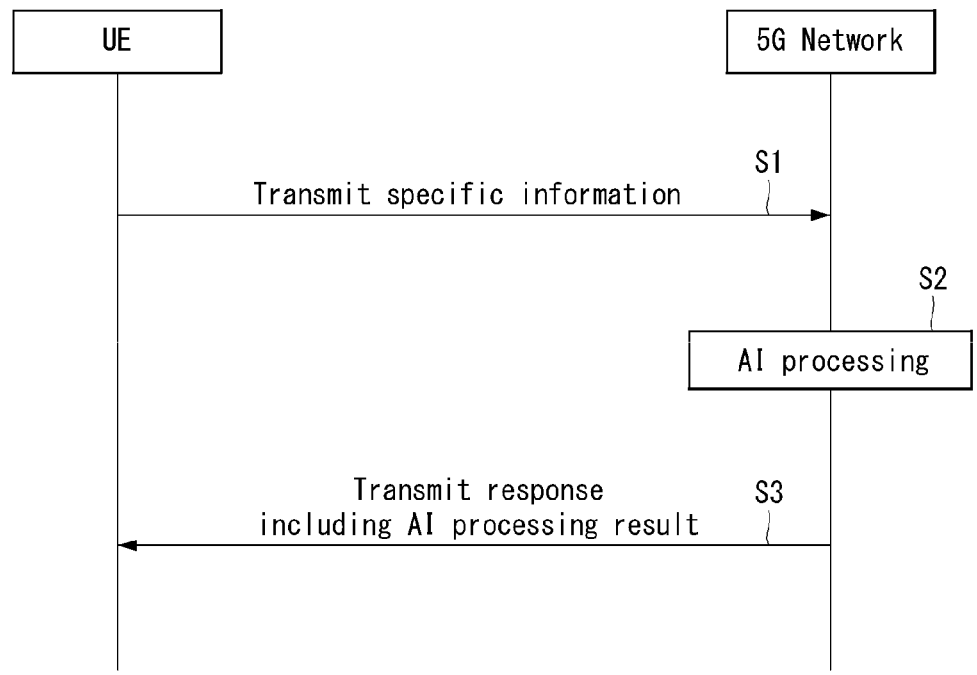

[FIG. 4]
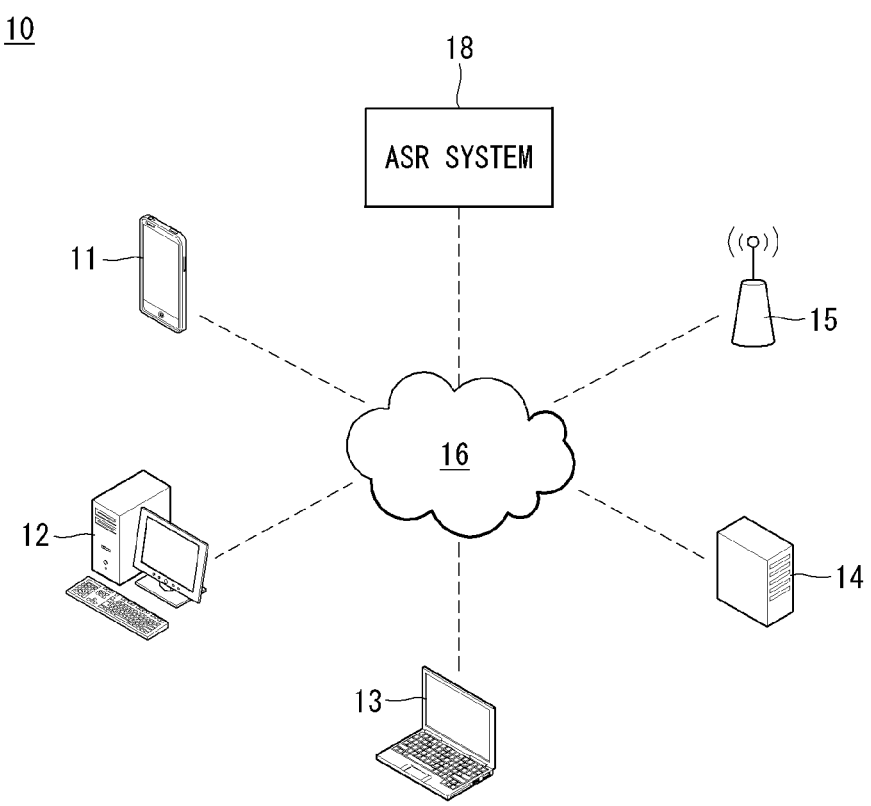

[FIG. 5]
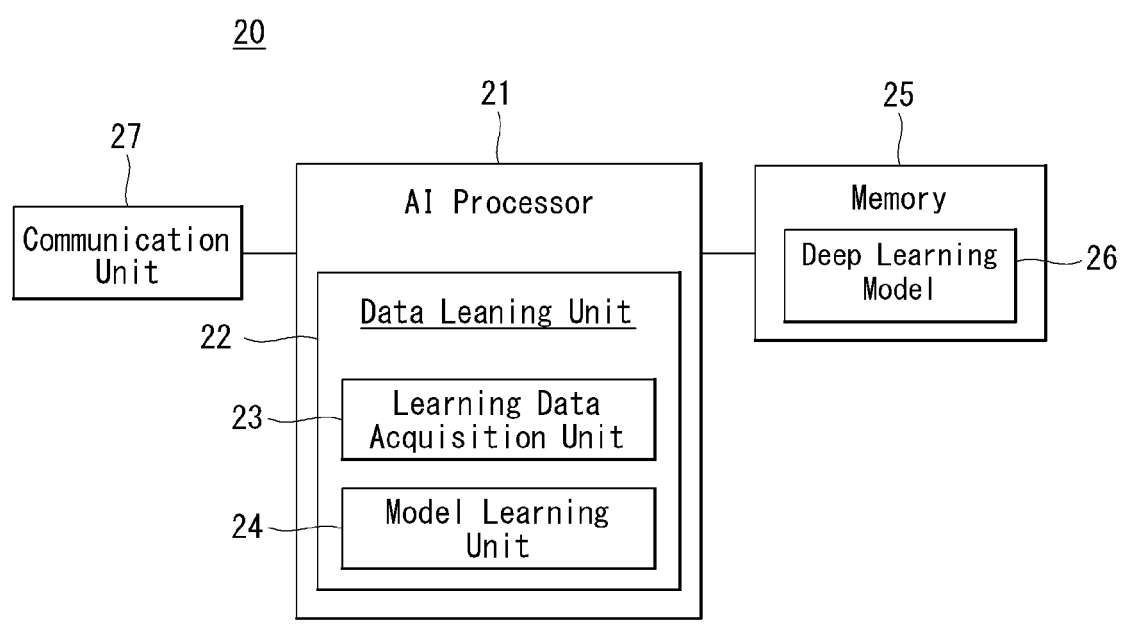

[FIG. 6]
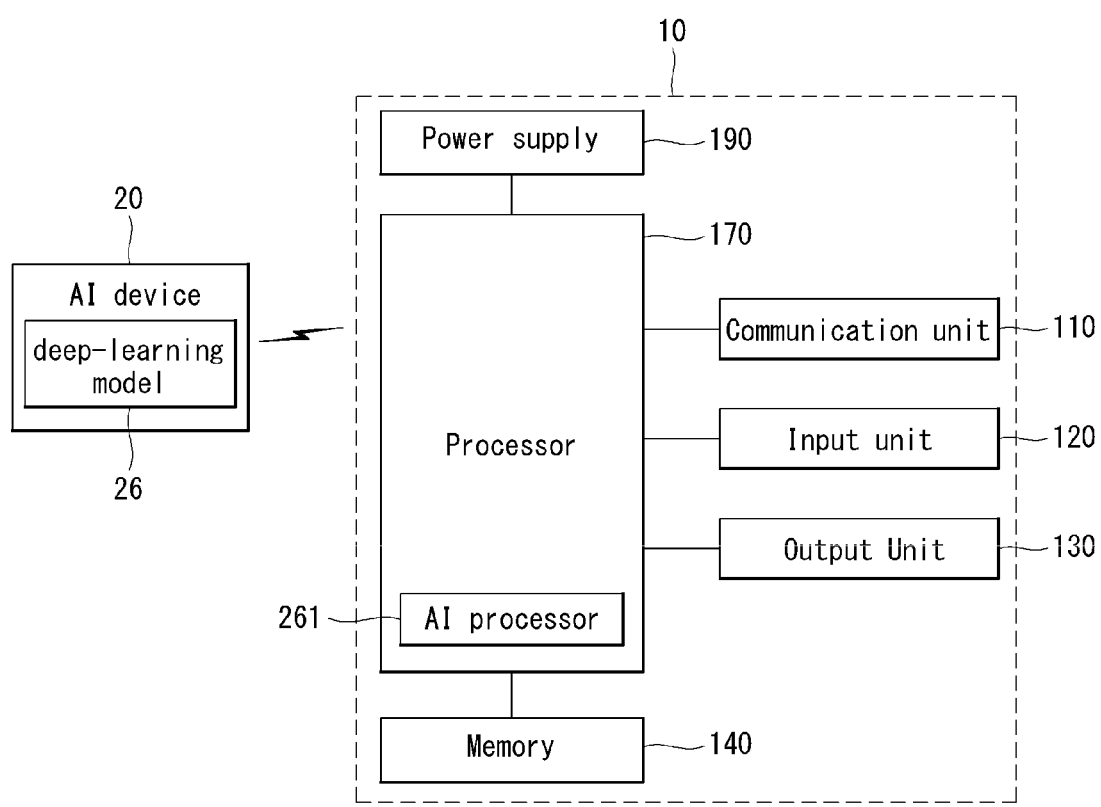

[FIG. 7]
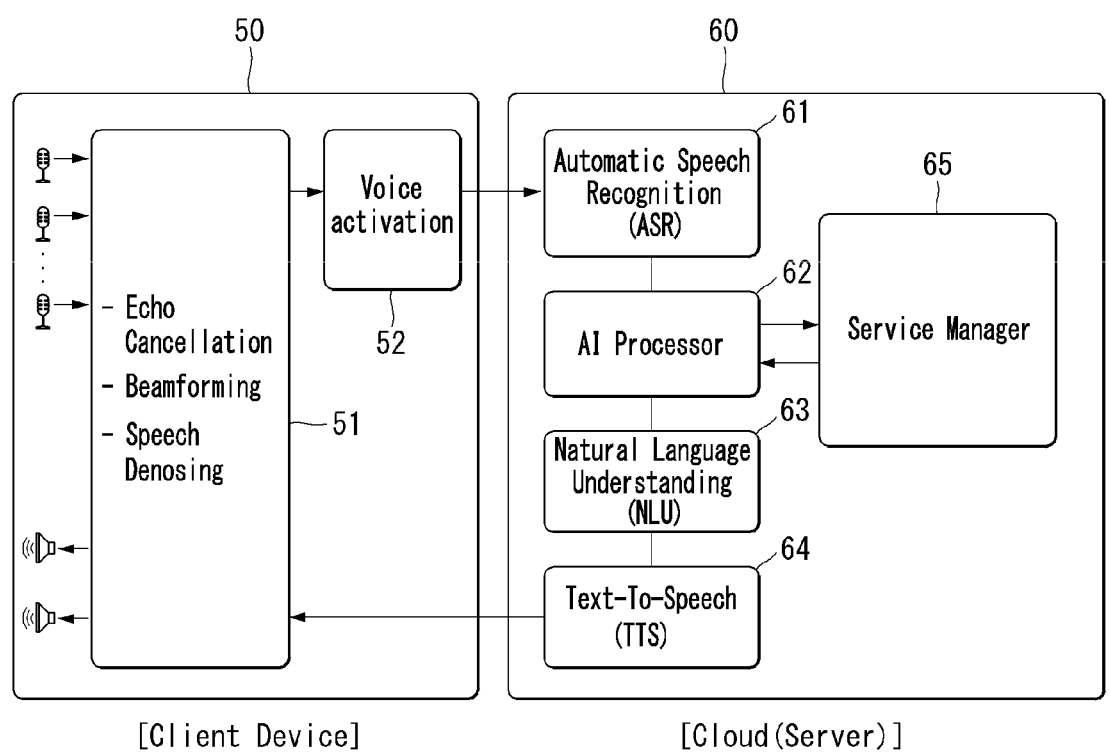

【FIG. 8】
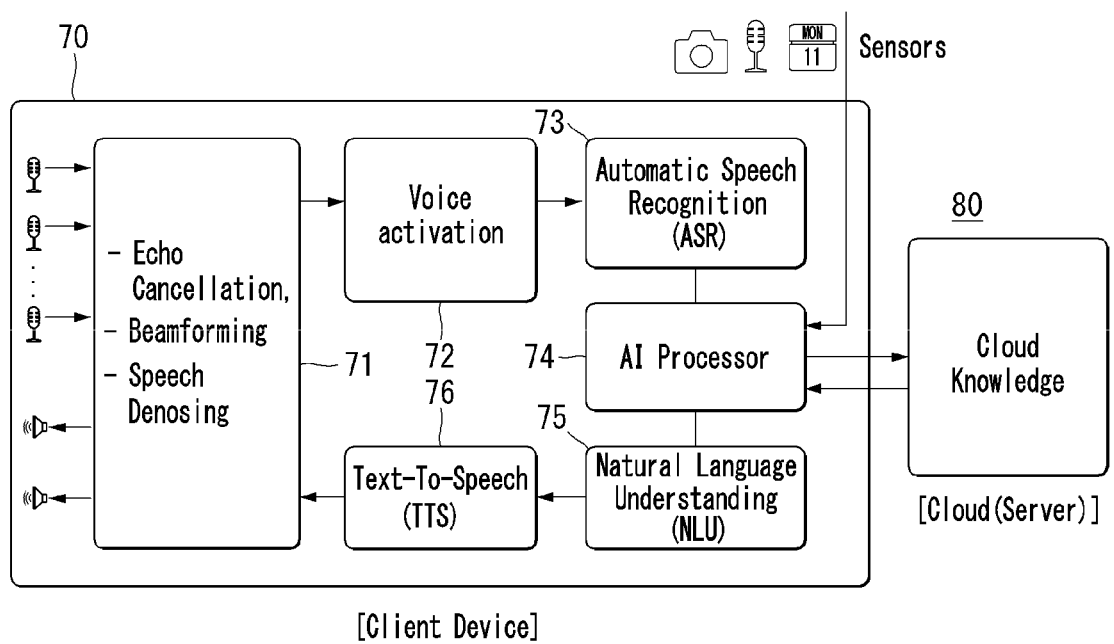

[FIG. 9]
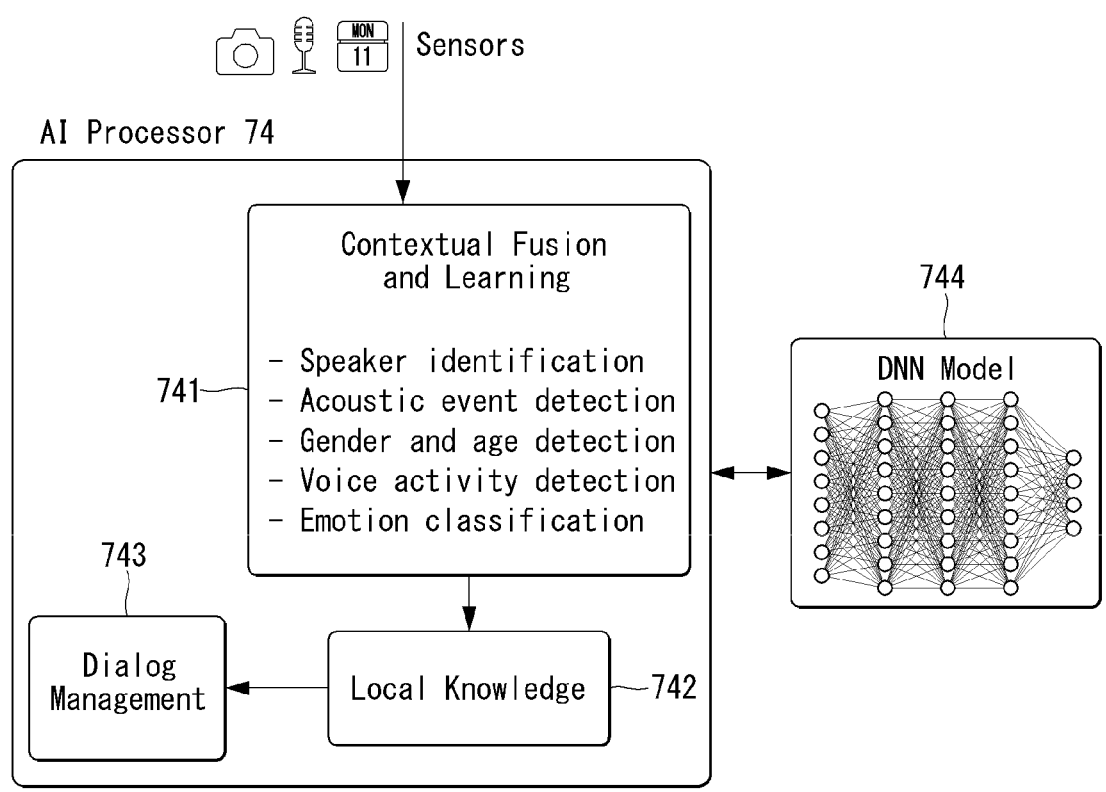

[FIG. 10]
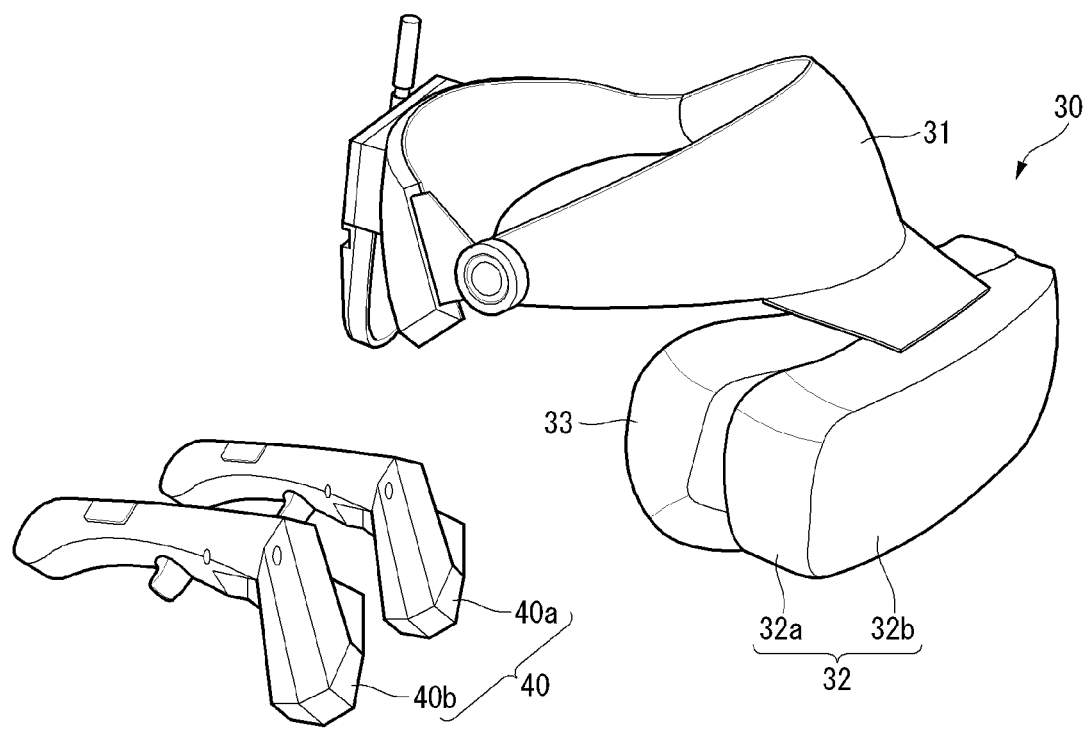

[FIG. 11]
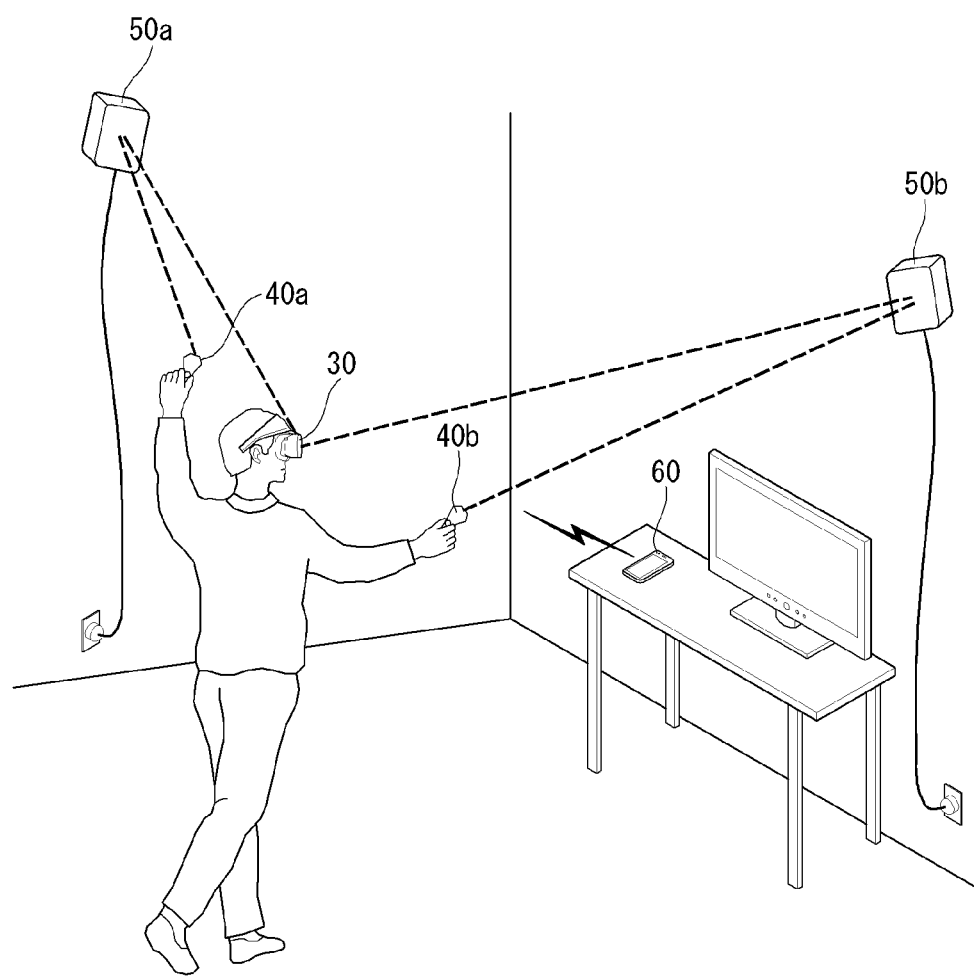

[FIG. 12]
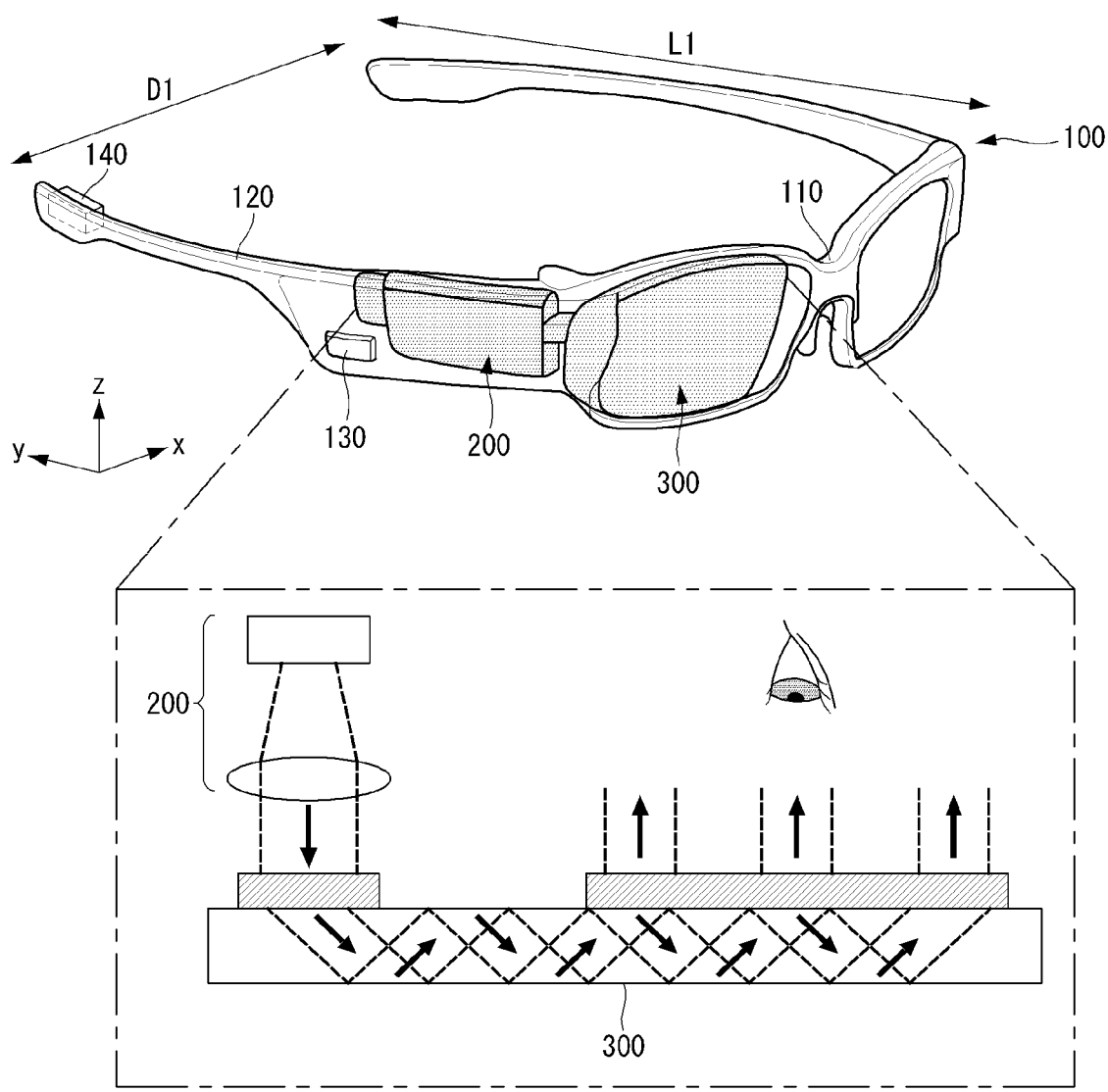

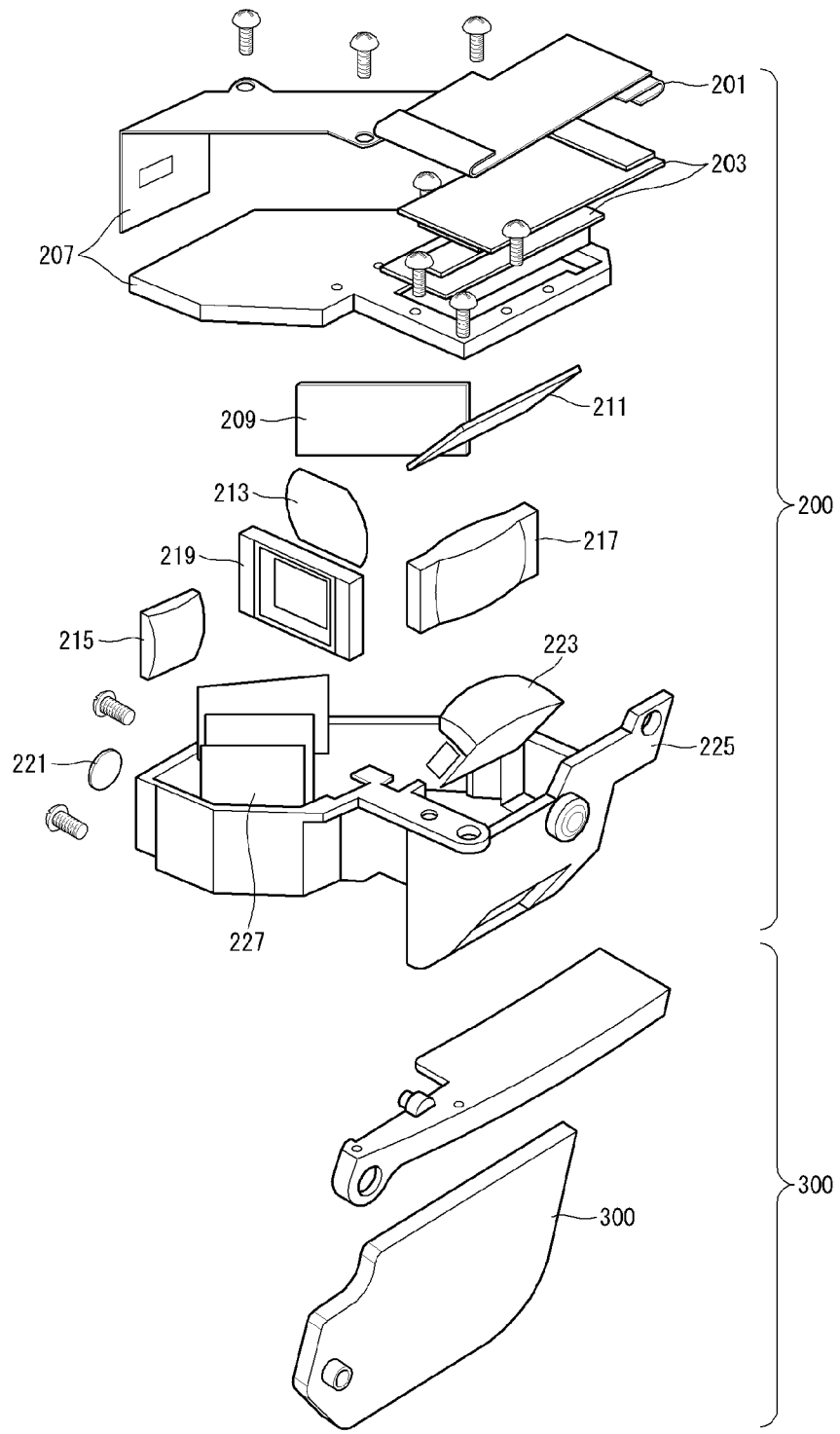
[FIG. 13]

[FIG. 14]
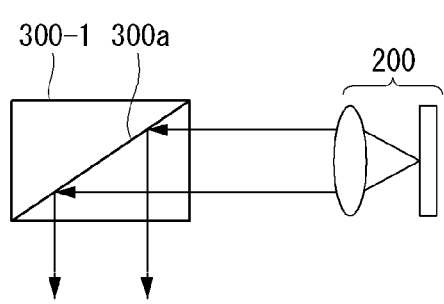
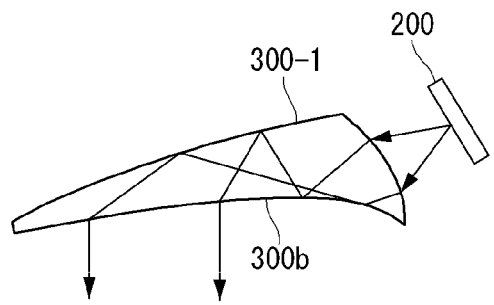
(a)  (b)

[FIG. 15]
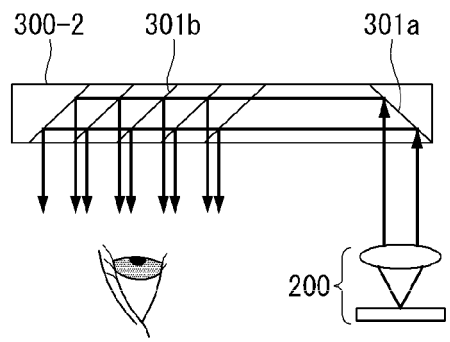
(a)
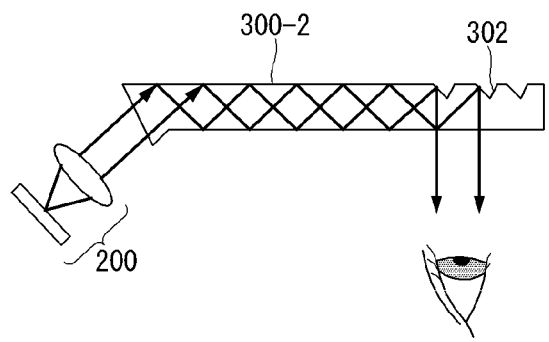
(b)
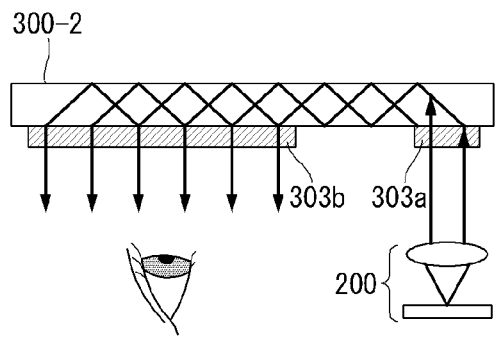
(c)
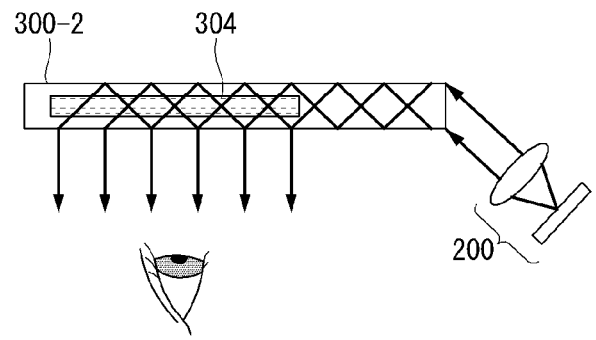
(d)
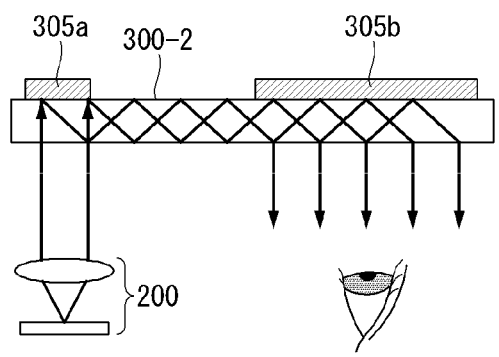
(e)
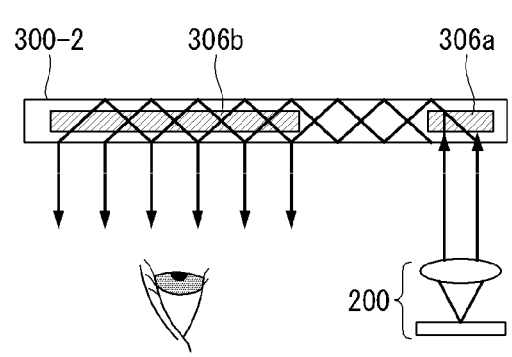
(f)

[FIG. 16]
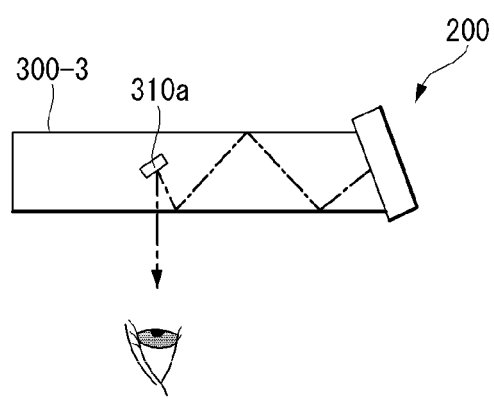
(a)
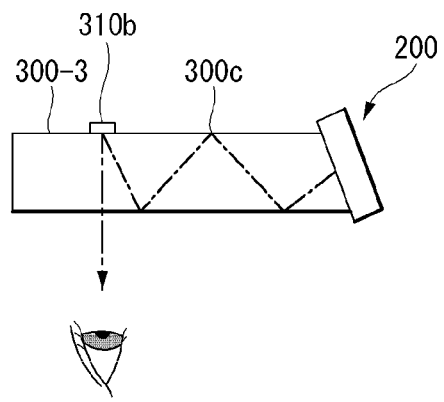
(b)
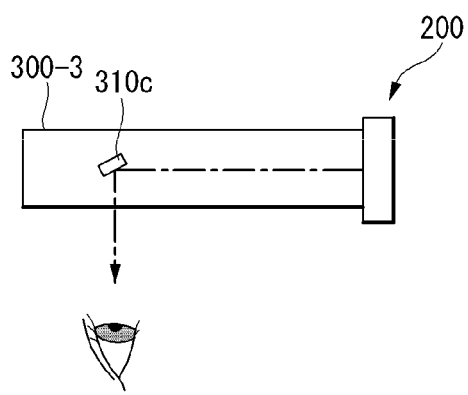
(c)
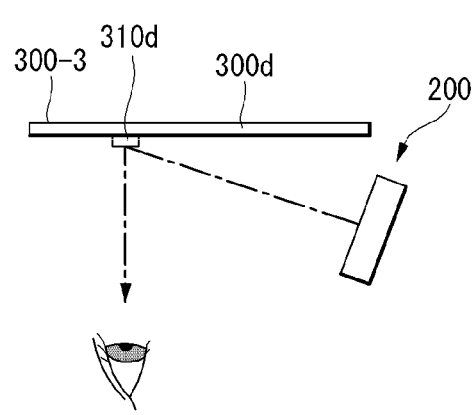
(d)

[FIG. 17]
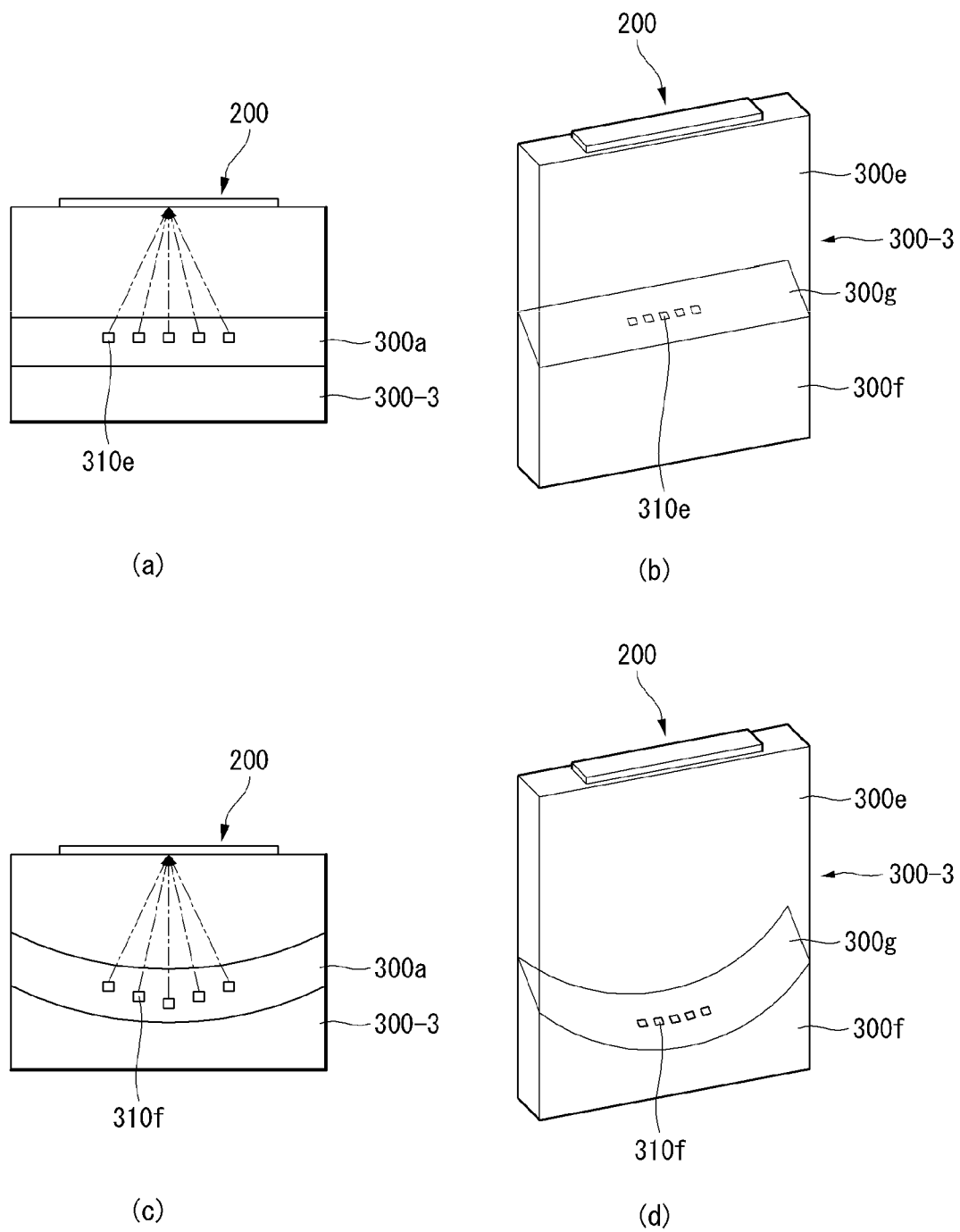

[FIG. 18]
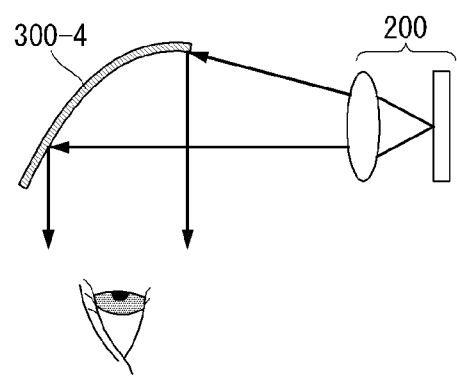
(a)
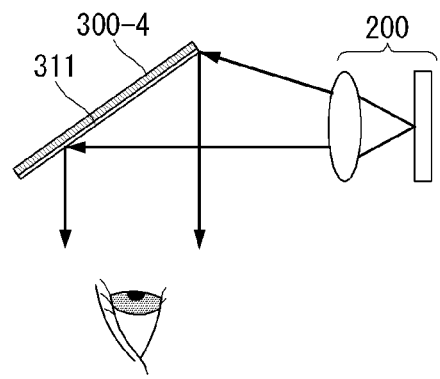
(b)
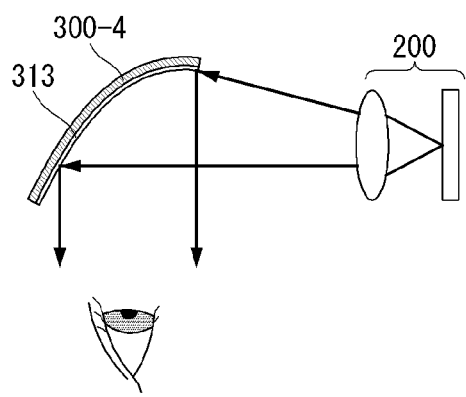
(c)

[FIG. 19]
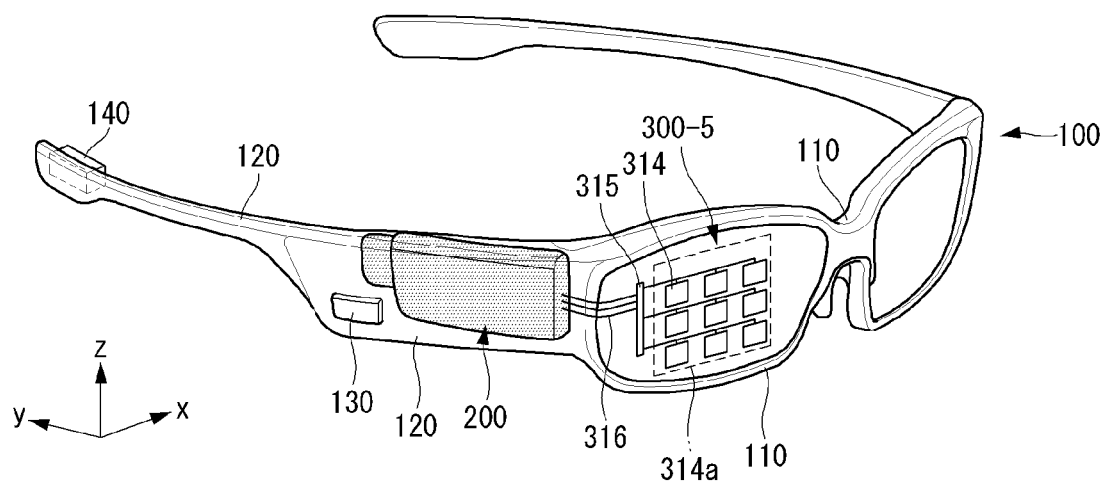

【FIG. 20】
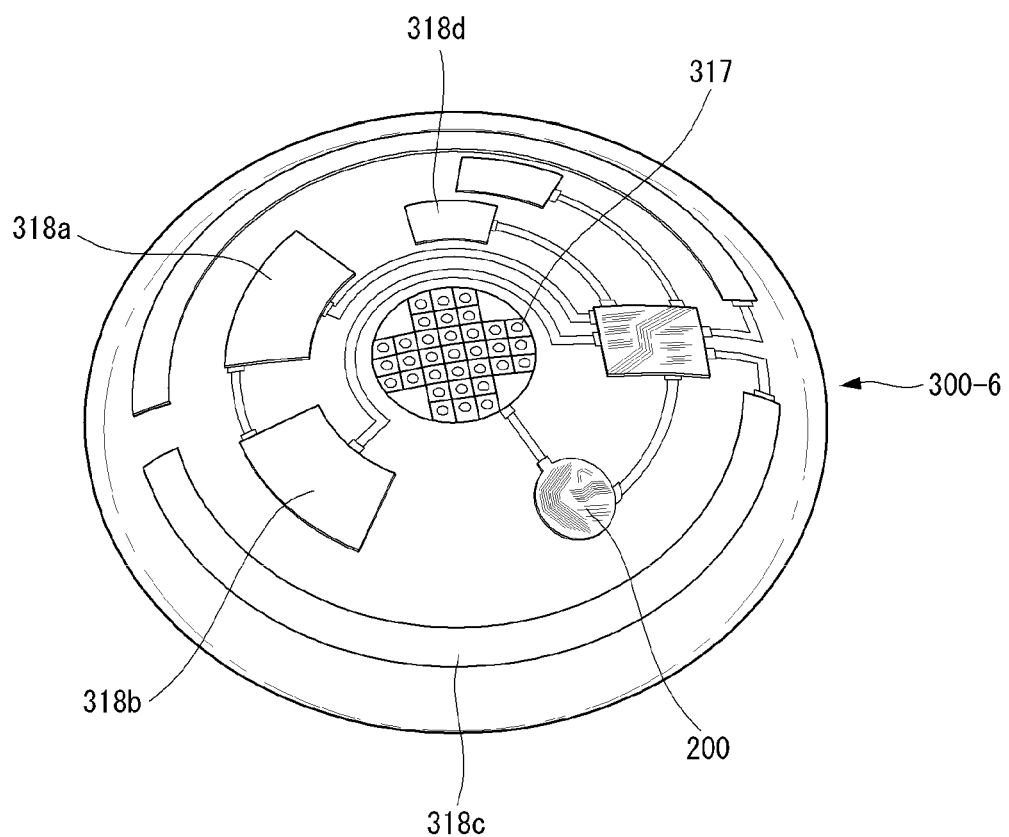

[FIG. 21]
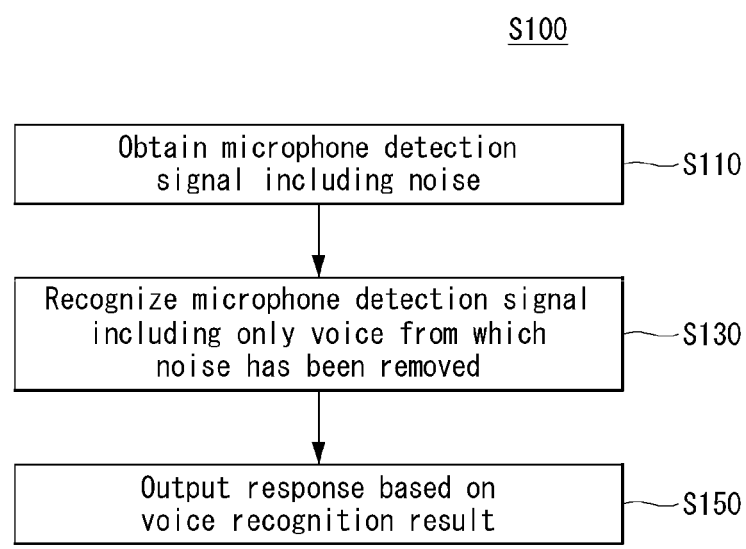

[FIG. 22]
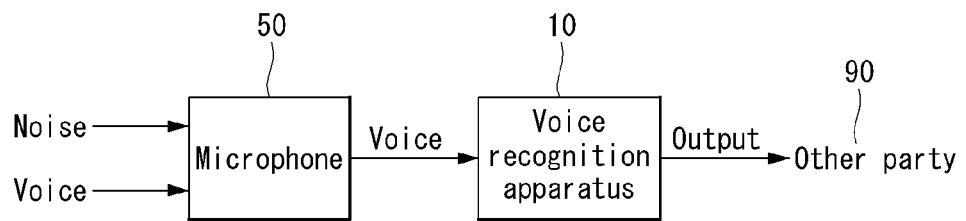

[FIG. 23]
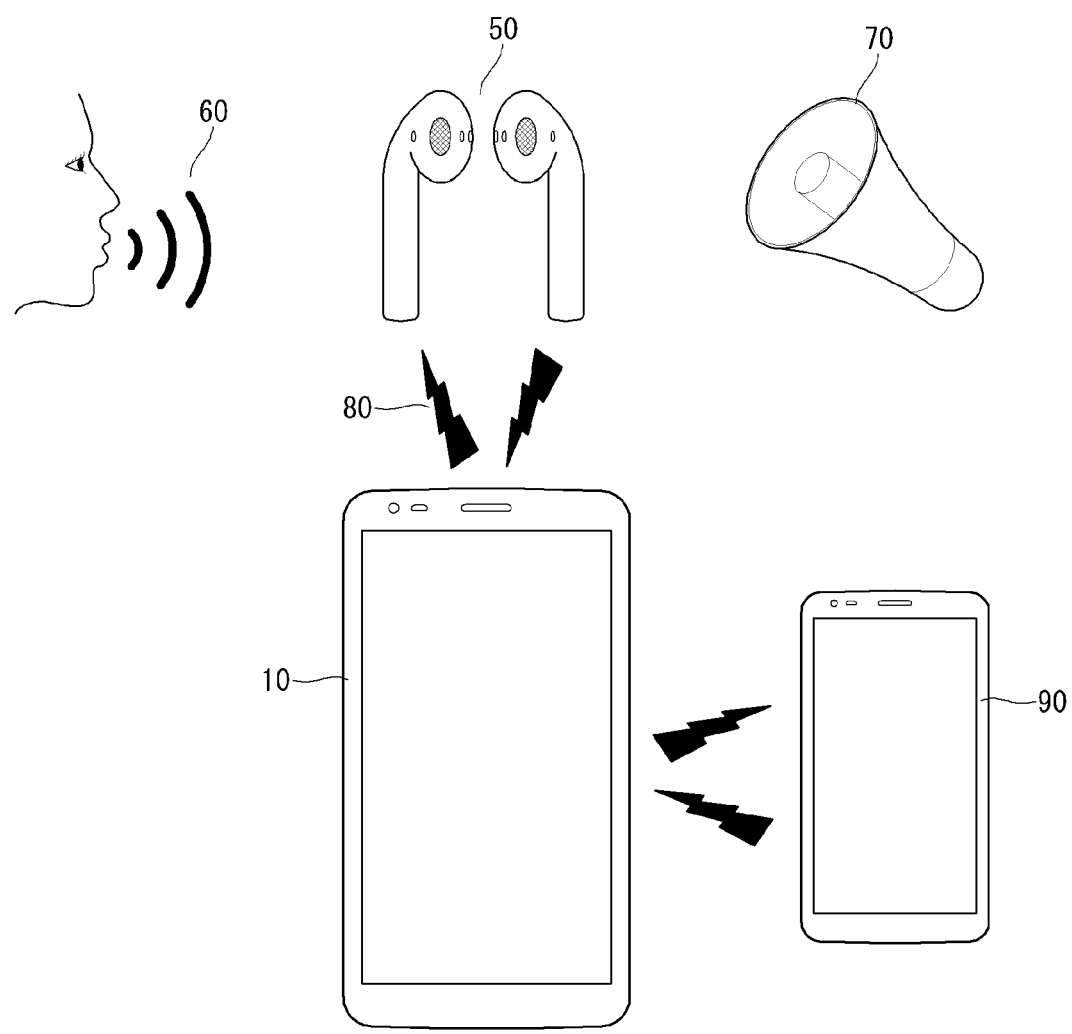

[FIG. 24]
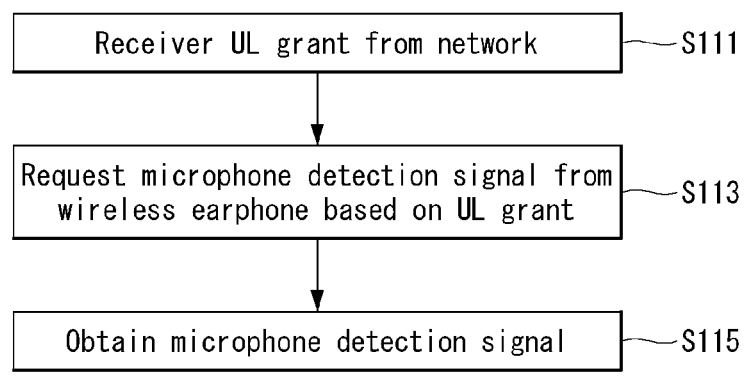

[FIG. 25]
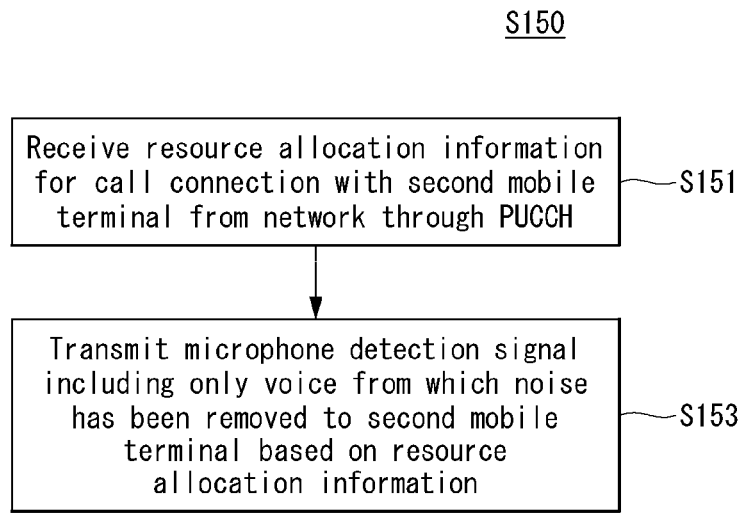

[FIG. 26]
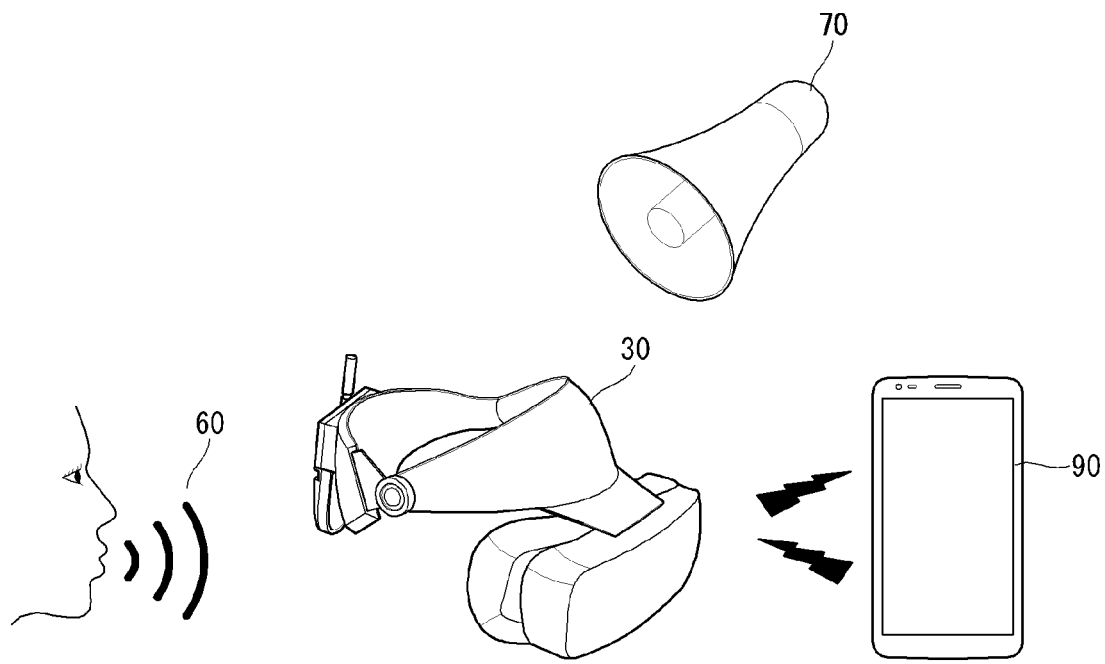

[FIG. 27]
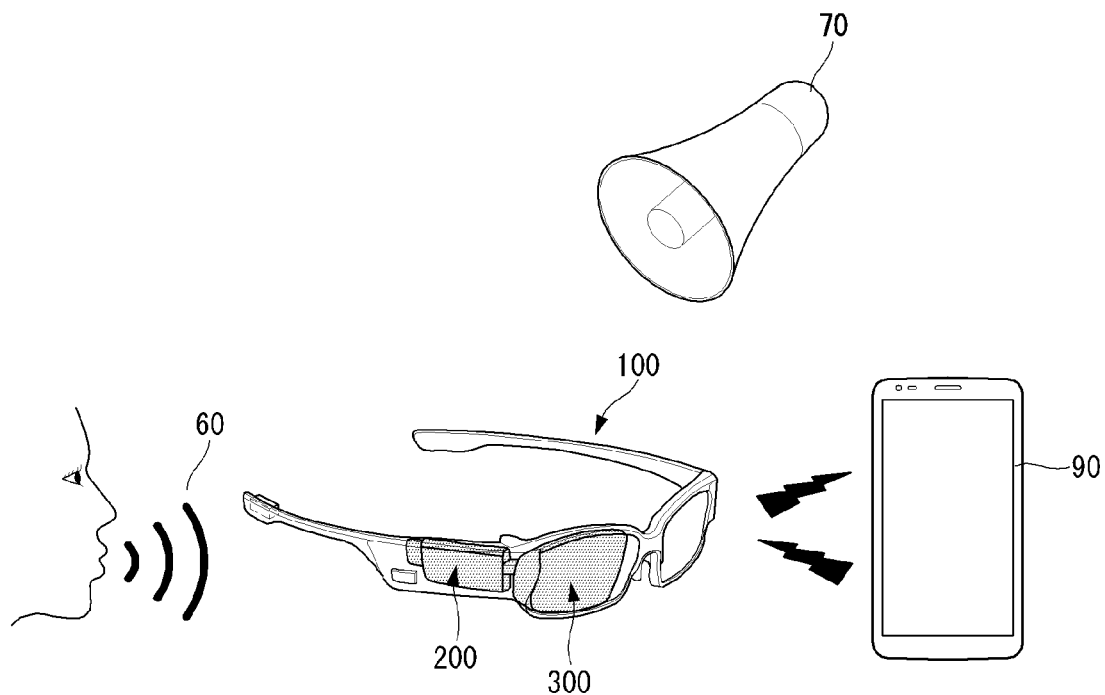

[FIG. 28]
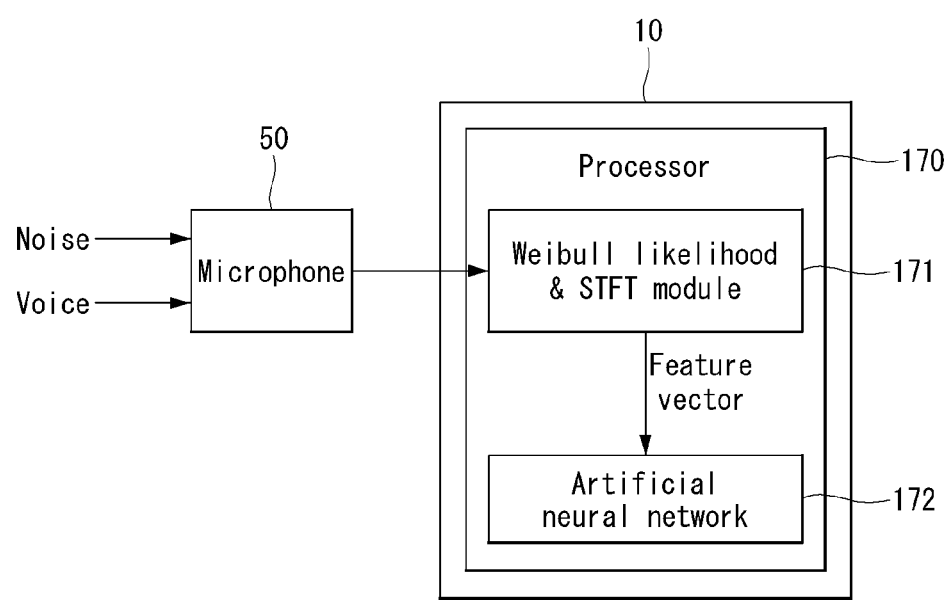

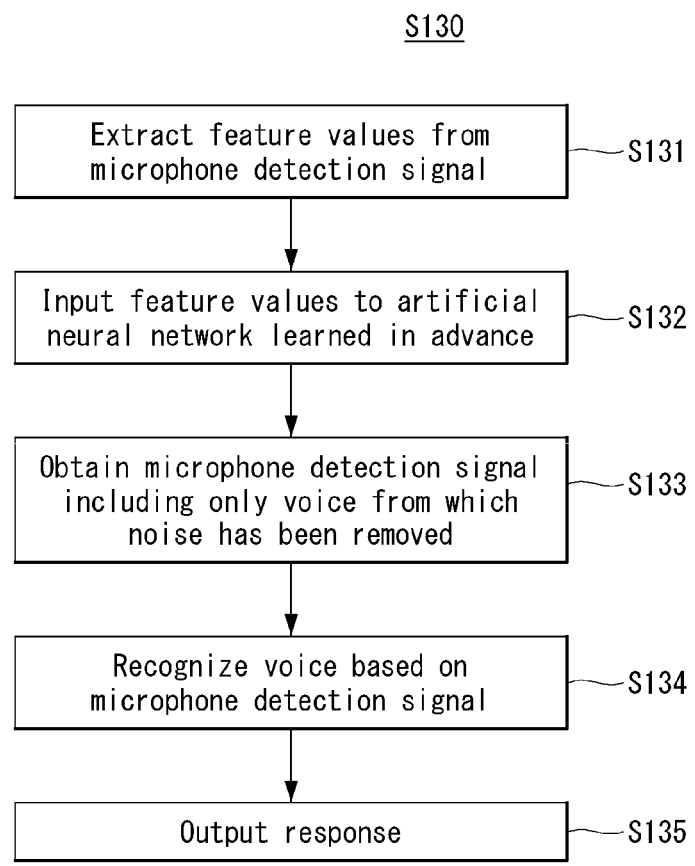

[FIG. 30]
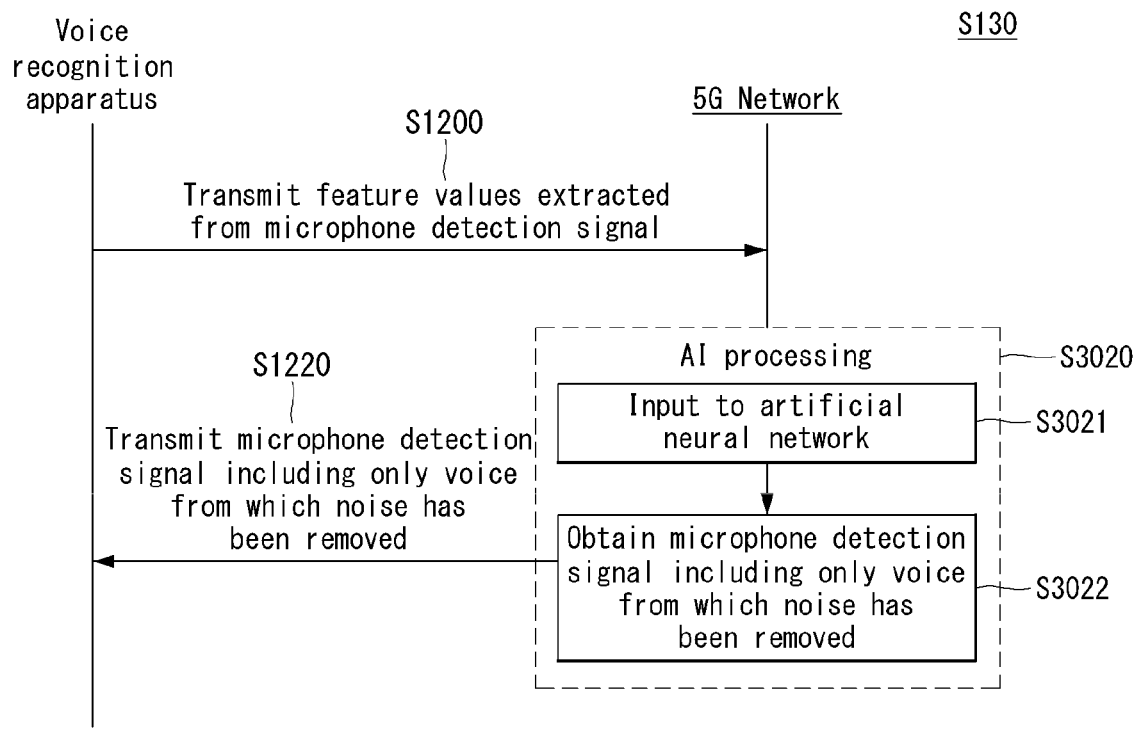

INTELLIGENT VOICE RECOGNIZING METHOD, APPARATUS, AND INTELLIGENT COMPUTING DEVICE

CROSS REFERENCE TO RELATED APPLICATIONS

This non-provisional application claims the benefit under 35 U.S.C. § 119(a) to Patent Application No. 10-2019-0098172, filed in the Republic of Korea on Aug. 12, 2019, which is hereby expressly incorporated by reference into the present application.

BACKGROUND OF THE INVENTION

Field of the Invention

The present invention relates to an intelligent voice recognizing method, apparatus and an intelligent computing device and, more specifically, to an intelligent voice recognizing method, apparatus and an intelligent computing device for distinguishing a voice from noise.

Related Art

A voice recognition apparatus is an apparatus which converts a user's voice into text, analyzes the meaning of a message included in the text and outputs a sound in a different form on the basis of analysis results.

Examples of voice recognition apparatuses may include mobile terminals such as smartphones, home robots of home IoT systems, and artificial intelligence (AI) speakers equipped with artificial intelligence technology.

Meanwhile, when a user inputs a voice to a voice recognition apparatus, a microphone of the voice recognition apparatus receives ambient noise as well as the user's voice so that it is difficult to recognize the user's voice.

SUMMARY OF THE INVENTION

An object of the present invention is to meet the needs and solve the problems.

Further, an object of the present invention is to realize an intelligent voice recognizing method, apparatus and an intelligent computing device for separating a user's voice from a microphone detection signal and recognizing the user's voice.

An intelligent voice recognition method of a voice recognition apparatus according to an embodiment of the present invention includes: obtaining a microphone detection signal; recognizing a voice of a user from the microphone detection signal; and outputting a response related to the voice on the basis of a result of recognition of the voice, wherein the microphone detection signal includes noise, and the recognizing of the voice comprises recognizing a microphone detection signal including only the voice obtained by removing the noise from the microphone detection signal.

The obtaining of the microphone detection signal may include obtaining the microphone detection signal from a wireless earphone for detecting external signals, wherein the recognizing of the voice comprises removing ambient noise of the wireless earphone from the microphone detection signal.

The obtaining of the microphone detection signal from the wireless earphone may include: receiving a UL grant from a network; requesting the microphone detection signal from the wireless earphone using frequency hopping set on the basis of the number of repetitions of transmission included in the UL grant; and obtaining the microphone detection signal in response to the request.

The outputting of the response may include transmitting a microphone detection signal including only the voice obtained by removing the noise from the microphone detection signal to an external device connected to the voice recognition apparatus for a call.

The outputting of the response may include: receiving resource allocation information for call connection with the external device from a network through a physical uplink control channel; and transmitting the microphone detection signal including only the voice from which the noise has been removed to the external device on the basis of the resource allocation information.

The voice recognition apparatus may include a virtual reality device or an augmented reality device, wherein the recognizing of the voice comprises removing ambient noise of a head module of the virtual reality device or the augmented reality device from the microphone detection signal.

The recognizing of the voice may include: inputting the microphone detection signal to an artificial neural network learned in advance; and obtaining the microphone detection signal including only the voice from which the noise has been removed as an output of the artificial neural network, wherein the artificial neural network is learned in advance on the basis of a training set including prestored sound signals and the voice of the user.

The intelligent voice recognition method may further include: receiving downlink control information (DCI) used to schedule transmission of the microphone detection signal obtained from at least one sensor included in the voice recognition apparatus from a network; and transmitting the microphone detection signal to the network on the basis of the DCI.

The intelligent voice recognition method may further include: performing an initial access procedure with the network on the basis of a synchronization signal block (SSB); and transmitting the microphone detection signal to the network through a PUSCH, wherein the SSB and a DM-RS of the PUSCH are quasi-co-located (QCLed) for QCL type D.

The intelligent voice recognition method may further include: controlling a communication module to transmit the microphone detection signal to an AI processor included in the network; and controlling the communication module to receive AI-processed information from the AI processor, wherein the AI-processed information is a microphone detection signal including only the voice from which the noise has been removed.

An intelligent voice recognition apparatus according to an embodiment of the present invention includes: a microphone for detecting external signals; a speaker for outputting sound to the outside; and a processor configured to obtain a microphone detection signal through the microphone, to recognize a voice of a user from the microphone detection signal, and to output a response related to the voice through the speaker on the basis of a result of recognition of the voice, wherein the microphone detection signal includes noise, and the processor recognizes a microphone detection signal including only the voice obtained by removing the noise from the microphone detection signal.

The processor may obtain the microphone detection signal from a wireless earphone for detecting external signals and remove ambient noise of the wireless earphone from the microphone detection signal.

The voice recognition apparatus may be a first mobile terminal including a communication module, and the processor may transmit a microphone detection signal including only the voice obtained by removing the noise from the microphone detection signal to a second mobile terminal connected to the first mobile terminal for a cell through the communication module.

The voice recognition apparatus may be a virtual reality device or an augmented reality device, and the processor may remove ambient noise of a head module of the virtual reality device or the augmented reality device from the microphone detection signal.

The processor may input the microphone detection signal to an artificial neural network learned in advance and obtain the microphone detection signal including only the voice from which the noise has been removed as an output of the artificial neural network, wherein the artificial neural network is learned in advance on the basis of a training set including prestored sound signals and the voice of the user.

The artificial neural network may be learned through a supervised learning method by setting the prestored signals as input values and setting the voice of the user as an output value.

The processor may separate the microphone detection signal into the voice of the user and the noise in the time domain and the frequency domain, extract feature vectors from the voice of the user and the noise and input the feature vectors to the artificial neural network.

The processor may receive downlink control information (DCI) used to schedule transmission of the microphone detection signal obtained from the microphone included in the voice recognition apparatus from a network through the communication module and transmit the microphone detection signal to the network on the basis of the DCI.

The processor may perform an initial access procedure with the network on the basis of a synchronization signal block (SSB) through the communication module and transmit the microphone detection signal to the network over a PUSCH through the communication module, wherein the SSB and a DM-RS of the PUSCH are QCLed for QCL type D.

The processor may control the communication module to transmit the microphone detection signal to an AI processor included in the network and control the communication module to receive AI-processed information from the AI processor, wherein the AI-processed information is a microphone detection signal including only the voice from which the noise has been removed.

A non-transitory computer-readable recording medium according to another embodiment of the present invention stores a computer-executable component configured to be executed in one or more processor of a computing device, the computer-executable component being configured to: obtain a microphone detection signal; recognize a voice of a user from the microphone detection signal; and output a response related to the voice on the basis of a result of recognition of the voice, wherein the microphone detection signal includes noise, and a microphone detection signal including only the voice obtained by removing the noise from the microphone detection signal is recognized.

BRIEF DESCRIPTION OF THE DRAWINGS

The accompanying drawings, included as part of the detailed description in order to provide a thorough understanding of the present invention, provide embodiments of the present invention and together with the description, describe the technical features of the present invention.

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIG. 4 shows an example of a schematic block diagram in which a text-to-speech (TTS) method according to an embodiment of the present invention is implemented.

FIG. 5 shows a block diagram of an AI device that may be applied to one embodiment of the present invention.

FIG. 6 is an exemplary block diagram of a voice recognition apparatus according to an embodiment of the present invention.

FIG. 7 shows a schematic block diagram of a text-to-speech (TTS) device in a TTS system according to an embodiment of the present invention.

FIG. 8 is a schematic block diagram of a TTS device in a TTS system environment according to an embodiment of the present invention.

FIG. 9 is a schematic block diagram of an AI processor capable of performing emotion classification information-based TTS according to an embodiment of the present invention.

FIG. 10 is a perspective view of a VR electronic device according to one embodiment of the present invention.

FIG. 11 illustrates a situation in which the VR electronic device of FIG. 3 is used.

FIG. 12 is a perspective view of an AR electronic device according to one embodiment of the present invention.

FIG. 13 is an exploded perspective view of a controller according to one embodiment of the present invention.

FIGS. 14 to 20 illustrate various display methods applicable to a display unit according to one embodiment of the present invention.

FIG. 21 is a flowchart illustrating an intelligent voice recognition method of a voice recognition apparatus according to an embodiment of the present invention.

FIG. 22 is a diagram showing an intelligent voice recognition process according to an embodiment of the present invention.

FIG. 23 is a diagram showing a voice recognition system according to an embodiment of the present invention.

FIG. 24 is a flowchart illustrating a microphone detection signal acquisition process of FIG. 21.

FIG. 25 is a flowchart illustrating a response output process of FIG. 21.

FIG. 26 illustrates a process in which a virtual reality device transmits a microphone detection signal including a voice from which noise has been removed to an external device.

FIG. 27 illustrates a process in which an augmented reality device transmits a microphone detection signal including a voice from which noise has been removed to an external device.

FIG. 28 illustrates a process of recognizing a microphone detection signal including a voice from which noise has been removed.

FIG. 29 is a flowchart showing a process of recognizing a microphone detection signal using an artificial neural network of FIG. 28.

FIG. 30 is a flowchart showing a process of performing steps S131 to S133 of FIG. 29 using AI processing of a 5G network.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. EXAMPLE OF BLOCK DIAGRAM OF UE AND 5G NETWORK

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. SIGNAL TRANSMISSION/RECEPTION METHOD IN WIRELESS COMMUNICATION System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. BEAM MANAGEMENT (BM) PROCEDURE OF 5G COMMUNICATION SYSTEM

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (ULTRA-RELIABLE AND LOW LATENCY COMMUNICATION)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. MMTC (MASSIVE MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. BASIC OPERATION OF AI PROCESSING USING 5G COMMUNICATION

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE(S3).

G. APPLIED OPERATIONS BETWEEN UE AND 5G NETWORK IN 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

H. VOICE RECOGNITION SYSTEM AND AI PROCESSING

FIG. 4 illustrates a block diagram of a schematic system in which a voice recognition method is implemented according to an embodiment of the present invention.

Referring to FIG. 4, a system in which a voice recognition method is implemented according to an embodiment of the present invention may include as a voice recognition apparatus 10, a network system 16, and a text-to-speech (TTS) system as a speech synthesis engine.

The at least one voice recognition device 10 may include a mobile phone 11, a PC 12, a notebook computer 13, and other server devices 14. The PC12 and notebook computer 13 may connect to at least one network system 16 via a wireless access point 15. According to an embodiment of the present invention, the voice recognition apparatus 10 may include an audio book and a smart speaker.

Meanwhile, the TTS system 18 may be implemented in a server included in a network, or may be implemented by on-device processing and embedded in the voice recognition device 10. In the exemplary embodiment of the present invention, it is assumed that the TTS system 18 is implemented in the voice recognition device 10.

FIG. 5 shows a block diagram of an AI device that may be applied to one embodiment of the present invention.

The AI device 20 may include an electronic device including an AI module capable of performing AI processing or a server including the AI module. In addition, the AI device 20 may be included in at least a part of the voice recognition device 10 illustrated in FIG. 4 and may be provided to perform at least some of the AI processing together.

The aforementioned AI processing may include all operations related to voice recognition of the voice recognition apparatus 10 shown in FIG. 5. For example, the AI processing may be a process of analyzing a microphone detection signal of the voice recognition apparatus 10 and recognizing a microphone detection signal including only a voice from which noise has been removed.

The AI device 20 may include an AI processor 21, a memory 25, and/or a communication unit 27.

The AI device 20 is a computing device capable of learning neural networks, and may be implemented as various electronic devices such as a server, a desktop PC, a notebook PC, a tablet PC, and the like.

The AI processor 21 may learn a neural network using a program stored in the memory 25.

Particularly, the AI processor 21 can learn a neural network for analyzing a microphone detection signal to recognize a microphone detection signal including only a voice from which noise has been removed. Here, the neural network for recognizing a microphone detection signal including only a voice from which noise has been removed can be designed to simulate the structure of the human brain on a computer and include a plurality of network nodes which simulates neurons of the human neural network and has weights.

The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by obtaining learning data to be used for learning and by applying the obtained learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data obtaining unit 23 and a model learning unit 24.

The learning data acquisition unit 23 can obtain learned data necessary for a neural network model for classifying and recognizing data. For example, learning data acquisition unit 23 can obtain a microphone detection signal and/or feature values extracted from a microphone detection signal to be input to the neural network model.

The model learning unit 24 can perform learning such that a neural network model has a determination reference about how to classify predetermined data, using the obtained learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data pre-processor can pre-process an obtained microphone detection signal such that the obtained microphone detection signal can be used for learning for recognizing a microphone detection signal including only a voice from which noise has been removed. For example, the learning data pre-processor can process an obtained microphone detection signal into a predetermined format such that the model learning unit 24 can use the obtained microphone detection signal for learning for recognizing a microphone detection signal including only a voice from which noise has been removed.

Further, the learning data selector can select data necessary for learning from learning data obtained by the learning data acquisition unit 23 or learning data pre-processed in the pre-processor. The selected learning data can be provided to the model learning unit 24. For example, the learning data selector can select only data about syllables included in a specific region as learning data by detecting the specific region from feature values of a microphone detection signal obtained in the voice recognition apparatus 10.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

FIG. 6 is an exemplary block diagram of a voice recognition apparatus according to an embodiment of the present invention.

One embodiment of the present invention may include computer readable and computer executable instructions that may be included in the voice recognition apparatus 10. Although FIG. 6 discloses a plurality of components included in the voice recognition apparatus 10, the components not disclosed may be included in the voice recognition apparatus 10.

A plurality of voice recognition apparatuses may be applied to one voice recognition apparatus. In such a multi-device system the voice recognition apparatus may comprise different components for performing various aspects of voice recognition processing. The voice recognition apparatus 10 shown in FIG. 6 is exemplary and may be an independent apparatus or may be implemented as a component of a larger apparatus or system.

One embodiment of the present invention may be applied to a plurality of different devices and computer systems, for example, a general purpose computing system, a server-client computing system, a telephone computing system, a laptop computer, a portable terminal, a PDA, a tablet computer, and the like. The voice recognition device 10 may also be applied to one component of another device or system that provides voice recognition such as automated teller machines (ATMs), kiosks, global positioning systems (GPS), home appliances (eg, refrigerators, ovens, washing machines, etc.), vehicles (vehicles), e-book readers.

As shown in FIG. 6, the voice recognition apparatus 10 includes a communication unit 110, an input unit 120, an output unit 130, a memory 140, a sensing unit 150, an interface unit 160, and a power supply unit 190 and/or processor 170. On the other hand, some of the components disclosed in the voice recognition apparatus 10 may appear as a single component several times in one device.

The voice recognition apparatus 10 may include an address/data bus (not shown) for transferring data between the components of the voice recognition apparatus 10. Each component in the voice recognition apparatus 10 may be directly connected to other components through the bus (not shown). Meanwhile, each component in the voice recognition apparatus 10 may be directly connected to the processor 170.

More specifically, the communication unit 110 may include one or more modules that enable communication between the above components, wireless communication between the electronic device 10 and the wireless communication system, between the electronic device 10 and another electronic device, or between the electronic device 10 and an external server. In addition, the communication unit 110 may include one or more modules for connecting the electronic device 10 to one or more networks.

The communication unit 110 may be a wireless communication device such as a radio frequency (RF), an infrared (Infrared), Bluetooth, a wireless local area network (WLAN) (Wi-Fi, etc.) or 5G network, a Long Term Evolution (LTE) network, wireless network wireless devices such as WiMAN networks, 3G networks.

The communication unit 110 may include at least one of a broadcast receiving module, a mobile communication module, a wireless internet module, a short range communication module, and a location information module.

The input unit 120 may include a microphone, a touch input unit, a keyboard, a mouse, a stylus, or another input unit.

In addition, the input unit 120 may include a camera or an image input unit for inputting an image signal, a microphone or an audio input unit for inputting an audio signal, and a user input unit (eg, a touch key, push key (mechanical key, etc.)) for receiving information from a user. The voice data or the image data collected by the input unit 120 may be analyzed and processed as a control command of the user.

The sensing unit 150 may include one or more sensors for sensing at least one of information in the electronic device 10, surrounding environment information surrounding the electronic device 10, and user information.

For example, the sensing unit 150 may include at least one of a proximity sensor, an illumination sensor, a touch sensor, an acceleration sensor, a magnetic sensor, and a gravity sensor (G-sensor), gyroscope sensor, motion sensor, RGB sensor, infrared sensor (IR sensor), fingerprint scan sensor, ultrasonic sensor, optical sensor (e.g., imaging means), microphones, battery gauges, environmental sensors (e.g. barometers, hygrometers, thermometers, radiation sensors, heat sensors, gas sensors, etc.), a chemical sensor (eg, electronic nose, healthcare sensor, biometric sensor, etc.). Meanwhile, the electronic device 10 disclosed herein may use a combination of information sensed by at least two or more of these sensors.

The output unit 130 may output information (for example, voice) processed by the voice recognition device 10 or another device. The output unit 130 may include a speaker, a headphone, or other suitable component for propagating voice. As another example, the output unit 130 may include an audio output unit. In addition, the output unit 130 may include a display (visual display or tactile display), audio speakers, headphones, printer or other output unit. The output unit 130 may be integrated into the voice recognition apparatus 10 or may be implemented separately from the voice recognition apparatus 10.

The output unit 130 is used to generate an output related to visual, auditory or tactile, and may include at least one of a display unit, an audio output unit, a hap tip module, and an optical output unit. The display unit may form a layer structure or an integrated structure with the touch sensor, thereby implementing a touch screen. Such a touch screen may serve as a user input means for providing an input interface between the augmented reality electronic device 10 and the user, and at the same time, provide an output interface between the augmented reality electronic device 10 and the user.

Input 120 and/or output 130 may also include an interface for connecting external peripherals such as Universal Serial Bus (USB), FireWire, Thunderbolt or other connection protocols. Input 120 and/or output 130 may also include a network connection, such as an Ethernet port, modem, or the like. The voice recognition apparatus 10 may be connected to the Internet or a distributed computing environment through the input unit 120 and/or the output unit 130. In addition, the voice recognition apparatus 10 may be connected to a removable or external memory (eg, a removable memory card, a memory key drive, a network storage, etc.) through the input unit 120 or the output unit 130.

The interface unit 160 serves as a path to various types of external devices connected to the electronic device 10. The electronic device 10 may receive virtual reality or augmented reality content from an external device through the interface unit 160, and may interact with each other by exchanging various input signals, sensing signals, and data.

For example, the interface unit 160 may include a device equipped with a wired/wireless headset port, an external charger port, a wired/wireless data port, a memory card port, and an identification module. It may include at least one of a port connecting, an audio input/output (I/O) port, a video input/output (I/O) port, and an earphone port. The memory 140 may store data and instructions. The memory 140 may include a magnetic storage, an optical storage, a solid-state storage type, and the like.

The memory 140 may include volatile RAM, nonvolatile ROM, or another type of memory.

In addition, the memory 140 stores data supporting various functions of the electronic device 10. The memory 140 may store a plurality of application programs or applications that are driven in the electronic device 10, data for operating the electronic device 10, and instructions. At least some of these applications may be downloaded from an external server via wireless communication. At least some of these application programs may be present on the electronic device 10 from the time of shipment for the basic functions of the electronic device 10 (for example, a call forwarding, a calling function, a message receiving, and a calling function).

The voice recognition apparatus 10 may include a processor 170. The processor 170 may be connected to a bus (not shown), an input unit 120, an output unit 130, and/or other components of the voice recognition device 10. The processor 170 may correspond to a CPU for processing data, a computer readable instruction for processing data, and a memory for storing data and instructions.

In addition to the operations associated with the application, the processor 170 also typically controls the overall operation of the electronic device 10. The processor 170 may process signals, data, information, and the like, which are input or output through the above-described components.

In addition, the processor 170 may control at least some of the components by driving an application program stored in the memory 140 to provide appropriate information to the user or to process a function. In addition, the processor 170 may operate at least two or more of the components included in the electronic device 10 in combination with each other to drive an application program.

In addition, the processor 170 may detect the movement of the electronic device 10 or the user by using a gyroscope sensor, a gravity sensor, a motion sensor, or the like included in the sensing unit 150. Alternatively, the processor 170 may detect an object approaching to the electronic device 10 or the user by using a proximity sensor, an illumination sensor, a magnetic sensor, an infrared sensor, an ultrasonic sensor, an optical sensor, etc. included in the sensing unit 150. In addition, the processor 170 may detect a user's movement through sensors provided in a controller that operates in conjunction with the electronic device 10.

In addition, the processor 170 may perform an operation (or function) of the electronic device 10 using an application program stored in the memory 140.

Computer instructions to be processed in the processor 170 for operating the voice recognition apparatus 10 and various components may be executed by the processor 170 and may include a memory 140, an external device, or a processor to be described later. It may be stored in the memory or storage included in (170). Alternatively, all or some of the executable instructions may be embedded in hardware or firmware in addition to software. One embodiment of the invention may be implemented in various combinations of software, firmware and/or hardware, for example.

In detail, the processor 170 may process the text data into an audio waveform including voice, or may process the audio waveform into text data. The source of the textual data may be generated by an internal component of the voice recognition apparatus 10. In addition, the source of the text data may be received from the input unit such as a keyboard or transmitted to the voice recognition apparatus 10 through a network connection. The text may be in the form of sentences that include text, numbers, and/or punctuation for conversion by the processor 170 into speech. The input text may also include a special annotation for processing by the processor 170, and may indicate how the specific text should be pronounced through the special annotation. The text data may be processed in real time or later stored and processed.

In addition, although not shown in FIG. 6, the processor 170 may include a front end, a speech synthesis engine, and a TTS storage. The preprocessor may convert the input test data into a symbolic linguistic representation for processing by the speech synthesis engine. The speech synthesis engine may convert the input text into speech by comparing annotated phonetic units models with information stored in the TTS storage. The preprocessor and the speech synthesis engine may include an embedded internal processor or memory, or may use the processor 170 and the memory 140 included in the voice recognition apparatus 10. Instructions for operating the preprocessor and the speech synthesis engine may be included in the processor 170, the memory 140 of the voice recognition apparatus 10, or an external device.

Text input to the processor 170 may be sent to the preprocessor for processing. The preprocessor may include a module for performing text normalization, linguistic analysis, and linguistic prosody generation.

During the text normalization operation, the preprocessor processes the text input and generates standard text, converting numbers, abbreviations, and symbols the same as they are written.

During the language analysis operation, the preprocessor may analyze the language of the normalized text to generate a series of phonetic units corresponding to the input text. This process may be called phonetic transcription.

Phonetic units are finally combined to include symbolic representations of sound units output by the voice recognition device 10 as speech. Various sound units can be used to segment text for speech synthesis.

Processor 170 includes phonemes (individual sounds), half-phonemes, di-phones (the last half of a phoneme combined with the first half of adjacent phonemes) and bi-phones. Speech can be processed based on two successive sonic speeds, syllables, words, phrases, sentences, or other units. Each word may be mapped to one or more phonetic units. Such mapping may be performed using a language dictionary stored in the voice recognition apparatus 10.

Linguistic analysis performed by the preprocessor may also involve identifying different grammatical elements, such as prefixes, suffixes, phrases, punctuation, and syntactic boundaries. Such grammatical components can be used by the processor 170 to produce natural audio waveform output. The language dictionary may also include letter-to-sound rules and other tools that may be used to pronounce previously unverified words or letter combinations that may be generated by the processor 170. In general, the more information included in the language dictionary, the higher the quality of voice output can be guaranteed.

Based on the language analysis, the preprocessor may perform language rhythm generation annotated to phonetic units with prosodic characteristics indicating how the final sound unit should be pronounced in the final output speech.

The rhyme characteristics may also be referred to as acoustic features. During the operation of this step, the preprocessor may integrate into the processor 170 taking into account any prosodic annotations involving text input. Such acoustic features may include pitch, energy, duration, and the like. Application of the acoustic feature may be based on prosodic models available to the processor 170.

This rhyme model represents how phonetic units should be pronounced in certain situations. For example, a rhyme model can include a phoneme's position in a syllable, a syllable's position in a word, or a word's position in a sentence or phrase, phrases neighboring phonetic units, and the like. Like the language dictionary, the more information of the prosodic model, the higher the quality of voice output can be guaranteed.

The output of the preprocessor may include a series of speech units annotated with prosodic characteristics. The output of the preprocessor may be referred to as a symbolic linguistic representation. The symbolic language representation may be sent to a speech synthesis engine.

The speech synthesis engine performs a process of converting a speech into an audio waveform for output to the user through the output unit 130. The speech synthesis engine may be configured to convert the input text into high quality natural speech in an efficient manner. Such high quality speech can be configured to pronounce as much as possible a human speaker.

The speech synthesis engine may perform speech synthesis using at least one other method.

The Unit Selection Engine contrasts a recorded speech database with a symbolic linguistic representation generated by the preprocessor. The unit selection engine matches the symbol language representation with the speech audio unit of the speech database. Matching units can be selected to form a speech output and the selected matching units can be connected together. Each unit has only an audio waveform corresponding to a phonetic unit, such as a short .wav file of a particular sound, with a description of the various acoustic characteristics associated with the .wav file (pitch, energy, etc.). In addition, the speech unit may include other information such as a word, a sentence or a phrase, a location displayed on a neighboring speech unit.

The unit selection engine can match the input text using all the information in the unit database to produce a natural waveform. The unit database may include an example of a number of speech units that provide different options to the voice recognition device 10 for connecting the units in speech. One of the advantages of unit selection is that natural voice output can be produced depending on the size of the database. In addition, as the unit database is larger, the voice recognition apparatus 10 may configure natural speech.

On the other hand, there is a parameter synthesis method in addition to the above-described unit selection synthesis. Parametric synthesis allows synthesis parameters such as frequency, volume and noise to be modified by a parametric synthesis engine, a digital signal processor, or other audio generating device to produce an artificial speech waveform.

Parametric synthesis can be matched to a desired linguistic representation desired output speech parameter using an acoustic model and various statistical techniques. Parameter synthesis not only processes speech without the large database associated with unit selection, but also enables accurate processing at high processing speeds. The unit selection synthesis method and the parameter synthesis method may be performed separately or in combination to generate a voice audio output.

Parametric speech synthesis may be performed as follows. The processor 170 may include an acoustic model capable of converting a symbolic linguistic representation into a synthetic acoustic waveform of the text input based on the audio signal manipulation. The acoustic model may include rules that may be used by the parameter synthesis engine to assign specific audio waveform parameters to input speech units and/or prosodic annotations. The rule can be used to calculate a score indicating the likelihood that a particular audio output parameter (frequency, volume, etc.) corresponds to the portion of the input symbolic language representation from the preprocessor.

The parametric synthesis engine may apply a plurality of techniques to match the voice to be synthesized with the input speech unit and/or the rhyme annotation. One common technique uses the Hidden Markov Model (HMM), which can be used to determine the probability that an audio output should match text input. The HMM can be used to convert the parameters of language and acoustic space into parameters to be used by a vocoder (digital voice encoder) to artificially synthesize the desired speech.

The voice recognition apparatus 10 may also include a speech unit database for use in unit selection. The voice unit database may be stored in memory 140 or other storage configuration. The voice unit database may include recorded speech utterance. The speech utterance may be text corresponding to the speech content. In addition, the speech unit database may include recorded speech (in the form of audio waveforms, feature vectors or other formats) that takes up significant storage space in the voice recognition device 10. Unit samples of the speech unit database may be classified in a variety of ways, including speech units (phonemes, diphonies, words, etc.), linguistic rhyme labels, sound feature sequences, speaker identities, and the like. Sample utterance can be used to generate a mathematical model corresponding to the desired audio output for a particular speech unit.

When the speech synthesis engine matches the symbolic language representation, it may select a unit in the speech unit database that most closely matches the input text (including both speech units and rhythm annotations). In general, the larger the voice unit database, the greater the number of selectable unit samples, thus enabling accurate speech output.

The processor 170 may transmit audio waveforms including audio output to the output unit 130 for output to the user. The processor 170 may store the audio waveform including speech in the memory 140 in a plurality of different formats, such as a series of feature vectors, uncompressed audio data, or compressed audio data. For example, processor 170 may encode and/or compress voice output using an encoder/decoder prior to the transmission. The encoder/decoder may encode and decode audio data such as digitized audio data, feature vectors, and the like. In addition, the functions of the encoder/decoder may be located in separate components or may be performed by the processor 170.

The memory 140 may store other information for voice recognition. The contents of memory 140 may be prepared for general voice recognition and TTS use, and may be customized to include sounds and words that are likely to be used in a particular application. For example, the TTS storage may include customized voice specialized for location and navigation for TTS processing by the GPS device.

The memory 140 may also be customized to the user based on the personalized desired voice output. For example, a user may prefer a voice that is output to a specific gender, a specific intonation, a specific speed, a specific emotion (eg, a happy voice). The speech synthesis engine may include a specialized database or model to describe such user preferences.

The voice recognition apparatus 10 may also be configured to perform TTS processing in multiple languages. For each language, processor 170 may include data, instructions, and/or components specifically configured to synthesize speech in a desired language.

The processor 170 may modify or update the contents of the memory 140 based on the feedback on the result of the TTS processing to improve performance, so that the processor 170 may improve awareness of the voice more than the capability provided by the training corpus.

As the processing power of the voice recognition apparatus 10 is improved, the speech output may be performed by reflecting the emotion attribute of the input text. Alternatively, even if the input text is not included in the emotion attribute, the voice recognition apparatus 10 may output the voice by reflecting the intention (emotional information) of the user who created the input text.

Indeed, when a model is built that will be integrated into a TTS module that performs TTS processing, the TTS system may integrate the various components mentioned above with other components. For example, the voice recognition apparatus 10 may include a block for setting a speaker.

The speaker setting unit may set the speaker for each character appearing in the script. The speaker setup unit may be integrated into the processor 170 or may be integrated as part of the preprocessor or speech synthesis engine. The speaker setting unit synthesizes text corresponding to a plurality of characters into a set speaker's voice using metadata corresponding to a speaker profile.

According to an embodiment of the present invention, a markup language may be used as the meta data, and preferably, speech synthesis markup language (SSML) may be used.

The power supply unit 190 receives power from an external power source or an internal power source under the control of the processor 170 to supply power to each component included in the electronic device 10. The power supply unit 190 includes a battery, and the battery may be provided in a built-in or replaceable form.

Hereinafter, a speech processing procedure performed by a device environment and/or a cloud environment or server environment will be described with reference to FIGS. 7 and 8. FIG. 7 shows an example in which, while a speech can be received in a device 50, a procedure of processing the received speech and thereby synthesize the speech, that is, overall operations of speech synthesis, is performed in a cloud environment 60. On the contrary, FIG. 8 shows an example of on-device processing indicating that a device 70 performs the aforementioned overall operations of speech synthesis by processing a received speech and thereby synthesizing the speech.

In FIGS. 7 and 8, the device environments 70 may be referred to as client devices, and the cloud environments 60 and 80 may be referred to as servers.

FIG. 7 shows a schematic block diagram of a text-to-speech (TTS) device in a TTS system according to an embodiment of the present invention.

In order to process a speech event in an end-to-end speech UI environment, various configurations are required. A sequence for processing the speech event performs signal acquisition playback, speech pre-processing, voice activation, voice recognition, natural language processing, and speech synthesis by which a device responds to a user.

The client device 50 may include an input module. The input module may receive a user input from a user. For example, the input module may receive the user input from an external device (e.g., a keyboard and a headset) connected thereto. In addition, for example, the input module may include a touch screen. In addition, for example, the input module may include a hardware key located in a user terminal.

According to an embodiment, the input module may include at least one microphone capable of receiving a user's utterance as a speech signal. The input module may include a speech input system and receive a user's speech as a speech signal through the speech input system. By generating an input signal for an audio input, the at least one microphone may determine a digital input signal for a user's speech. According to an embodiment, multiple microphones may be implemented as an array. The array may be arranged in a geometric pattern, for example, a linear geometric shape, a circular geometric shape, or a different random shape. For example, the array may be in a pattern in which four sensors are placed at 90 degrees to receive sound from four directions. In some embodiments, the microphone may include sensors of different arrays in a space of data communication, and may include a networked array of the sensors. The microphone may include an omnidirectional microphone and a directional microphone (e.g., a shotgun microphone).

The client device 50 may include a pre-processing module 51 capable of pre-processing a user input (speech signal) that is received through the input module (e.g., a microphone).

The pre-processing module 51 may include an adaptive echo canceller (AEC) function to thereby remove echo included in a user speech signal received through the microphone. The pre-processing module 51 may include a noise suppression (NS) function to thereby remove background noise included in a user input. The pre-processing module 51 may include an end-point detect (EPD) function to thereby detect an end point of a user speech and thus find out where the user speech exists. In addition, the pre-processing module 51 may include an automatic gain control (AGC) function to thereby control volume of the user speech in such a way suitable for recognizing and processing the user speech.

The client device 50 may include a voice activation module 52. The voice activation module 52 may recognize a wake-up call indicative of recognition of a user's call. The voice activation module 52 may detect a predetermined keyword (e.g., Hi LG) from a user input which has been pre-processed. The voice activation module 52 may remain in a standby state to perform an always-on keyword detection function.

The client device 50 may transmit a user voice input to a cloud server. ASR and natural language understanding (NLU) operations, which are essential to process a user speech, is generally performed in Cloud due to computing, storage, power limitations, and the like. The Cloud may include the cloud device 60 that processes a user input transmitted from a client. The cloud device 60 may exists as a server.

The cloud device 60 may include an auto voice recognition (ASR) module 61, an artificial intelligent agent 62, a natural language understanding (NLU) module 63, a text-to-speech (TTS) module 64, and a service manager 65.

The ASR module 61 may convert a user input, received from the client device 50, into textual data.

The ASR module 61 includes a front-end speech pre-processor. The front-end speech pre-processor extracts a representative feature from a speech input. For example, the front-perform a Fourier transform on the speech input to extract spectral features that characterize the speech input as a sequence of representative multi-dimensional vectors. In addition, The ASR module 61 may include one or more voice recognition modules (e.g., an acoustic model and/or a language module) and may realize one or more voice recognition engines. Examples of the voice recognition model include Hidden Markov Models, Gaussian-Mixture Models, Deep Neural Network Models, n-gram language models, and other statistical models. Examples of the voice recognition model include a dynamic time warping (DTW)-based engine and a weighted finite state transducer (WFST)-based engine. The one or more voice recognition models and the one or more voice recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens).

Once the ASR module 61 generates a recognition result including a text string (e.g., words, or sequence of words, or sequence of tokens), the recognition result is transmitted to the NLP module 732 for intention deduction. In some examples, The ASR module 730 generates multiple candidate text expressions for a speech input. Each candidate text expression is a sequence of works or tokens corresponding to the speech input.

The NLU module 63 may perform a syntactic analysis or a semantic analysis to determine intent of a user. The syntactic analysis may be used to divide a user input into syntactic units (e.g., words, phrases, morphemes, or the like) and determine whether each divided unit has any syntactic element. The semantic analysis may be performed using semantic matching, rule matching, formula matching, or the like. Thus, the NLU module 63 may obtain a domain, intent, or a parameter (or a slot) necessary to express the intent from a user input through the above-mentioned analysis.

According to an embodiment, the NLU module 63 may determine the intent of the user and a parameter using a matching rule which is divided into a domain, intent, and a parameter. For example, one domain (e.g., an alarm) may include a plurality of intents (e.g., alarm setting, alarm release, and the like), and one intent may need a plurality of parameters (e.g., a time, the number of iterations, an alarm sound, and the like). The plurality of rules may include, for example, one or more mandatory parameters. The matching rule may be stored in a natural language understanding database.

According to an embodiment, the NLU module 63 may determine a meaning of a word extracted from a user input using a linguistic feature (e.g., a syntactic element) such as a morpheme or a phrase and may match the determined meaning of the word to the domain and intent to determine the intent of the user. For example, the NLU module 63 may determine the intent of the user by calculating how many words extracted from a user input are included in each of the domain and the intent. According to an embodiment, the NLU module 63 may determine a parameter of the user input using a word which is the basis for determining the intent. According to an embodiment, the NLU module 63 may determine the intent of the user using a NLU DB which stores the linguistic feature for determining the intent of the user input. According to another embodiment, the NLU module 63 may determine the intent of the user using a personal language model (PLM). For example, the NLU module 63 may determine the intent of the user using personalized information (e.g., a contact list, a music list, schedule information, social network information, etc.). For example, the PLM may be stored in, for example, the NLU DB. According to an embodiment, the ASR module 61 as well as the NLU module 63 may recognize a voice of the user with reference to the PLM stored in the NLU DB.

According to an embodiment, the NLU module 63 may further include a natural language generating module (not shown). The natural language generating module may change specified information to a text form. The information changed to the text form may be a natural language speech. For example, the specified information may be information about an additional input, information for guiding the completion of an action corresponding to the user input, or information for guiding the additional input of the user. The information changed to the text form may be displayed in a display after being transmitted to the client device or may be changed to a voice form after being transmitted to the TTS module.

The TTS module 64 may convert text input to voice output. The TTS module 64 may receive text input from the NLU module 63 of the LNU module 63, may change the text input to information in a voice form, and may transmit the information in the voice form to the client device 50. The client device 50 may output the information in the voice form via the speaker.

The speech synthesis module 64 synthesizes speech outputs based on a provided text. For example, a result generated by the ASR module 61 may be in the form of a text string. The speech synthesis module 64 may convert the text string to an audible speech output. The speech synthesis module 64 may use any appropriate speech synthesis technique in order to generate speech outputs from text, including, but not limited, to concatenative synthesis, unit selection synthesis, diphone synthesis, domain-specific synthesis, format synthesis, articulatory synthesis, hidden Markov model (HMM) based synthesis, and sinewave synthesis.

In some examples, the speech synthesis module 64 may be configured to synthesize individual words based on phonemic strings corresponding to the words. For example, a phonemic string can be associated with a word in a generated text string. The phonemic string can be stored in metadata associated with the word. The speech synthesis model 64 may be configured to directly process the phonemic string in the metadata to synthesize the word in speech form.

Since the cloud environment generally has more processing capabilities or resources than the client device, a higher quality speech output may be obtained in synthesis on the client side. However, the present invention is not limited thereto, and the speech synthesis process may be performed on the client side (see FIG. 8).

Meanwhile, according to an embodiment, the client environment may further include an Artificial Intelligence (AI) agent 62. The AI processor 62 is defined to perform at least some of the above-described functions performed by the ASR module 61, the NLU module 62 and/or the TTS module 64. In addition, the AI module 62 may make contribution so that the ASR module 61, the NLU module 62 and/or the TTS module 64 perform independent functions, respectively.

The AI processor module 62 may perform the above-described functions through deep learning. The deep learning represents a certain data in a form readable by a computer (e.g., when the data is an image, pixel information is represented as column vectors or the like), and efforts are being made to conduct enormous researches for applying the representation to learning (which is about how to create better representation techniques and how to create a model that learns the better representation techniques), and, as a result, various deep learning techniques such as deep neural networks (DNN), convolutional deep neural networks (CNN), Recurrent Boltzmann Machine (RNN), Restricted Boltzmann Machine (RBM), deep belief networks (DBN), and Deep Q-Network, may be applied to computer vision, voice recognition, natural language processing, speech/signal processing, and the like.

Currently, all commercial voice recognition systems (Microsoft's Cortana, Skype translator, Google Now, Apple Siri, etc.) are based on deep learning techniques.

In particular, the AI processor module 62 may perform various natural language processes, including machine translation, emotion analysis, and information retrieval, to process natural language by use of a deep artificial neural network architecture.

Meanwhile, the cloud environment may include a service manager 65 capable of collecting various personalized information and supporting a function of the AI processor 62. The personalized information obtained through the service manager may include at least one data (a calendar application, a messaging service, usage of a music application, etc.) used through the cloud environment, at least one sensing data (a camera, a microphone, temperature, humidity, a gyro sensor, C-V2X, a pulse, ambient light, Iris scan, etc.) collected by the client device 50 and/or the cloud 60, off device data directly not related to the client device 50. For example, the personalized information may include maps, SMS, news, music, stock, weather, Wikipedia information.

For convenience of explanation, the AI processor 62 is represented as an additional block to be distinguishable from the ASR module 61, the NLU module 63, and the TTS module 64, but the AI processor 62 may perform at least some or all of the functions of the respective modules 61, 62, and 64.

In FIG. 7, an example in which the AI processor 62 is implemented in the cloud environment due to computing calculation, storage, power limitations, and the like, but the present invention is not limited thereto.

For example, FIG. 8 is identical to what is shown in FIG. 7, except for a case where the AI processor is included in the cloud device.

FIG. 8 is a schematic block diagram of a TTS device in a TTS system environment according to an embodiment of the present invention. A client device 70 and a cloud environment 80 shown in FIG. 8 may correspond to the client device 50 and the cloud device 60 aforementioned in FIG. 7, except for some configurations and functions. Accordingly, description about specific functions of corresponding blocks may refer to FIG. 7.

Referring to FIG. 8, the client device 70 may include a pre-processing module 51, a voice activation module 72, an ASR module 73, an AI processor 74, an NLU module 75, and a TTS module 76. In addition, the client device 50 may include an input module (at least one microphone) and at least one output module.

In addition, the cloud environment may include cloud knowledge 80 that stores personalized information in a knowledge form.

A function of each module shown in FIG. 8 may refer to FIG. 7. However, since the ASR module 73, the NLU module 75, and the TTS module 76 are included in the client device 70, communication with Cloud may not be necessary for a speech processing procedure such as voice recognition, speech synthesis, and the like, and thus, an instant real-time speech processing operation is possible.

Each module shown in FIGS. 7 and 8 are merely an example for explaining a speech processing procedure, and modules more or less than in FIGS. 7 and 8 may be included. In addition, two or more modules may be combined or different modules or modules with different arrangement structures may be included. The various modules shown in FIGS. 7 and 8 may be implemented in hardware, software instructions for execution by one or more processors, firmware, including one or more signal processing and/or application specific integrated circuits, or a combination thereof.

FIG. 9 is a schematic block diagram of an AI processor capable of performing emotion classification information-based TTS according to an embodiment of the present invention.

Referring to FIG. 9, in the speech processing procedure described with reference to FIGS. 7 and 8, the AI processor 74 may support an interactive operation with a user, in addition to an ASR operation, an NLU operation, and a TTS operation. Alternatively, using context information, the AI processor 74 may make contribution so that the NLU module 63 further clarify, complements, or additionally define information included in text expressions received from the ASR module 61.

Here, the context information may include preference of a user of a client device, hardware and/or software states of the client device, various types of sensor information received before, during, or after a user input, previous interactions (e.g., dialogue) between the AI processor and the user, etc. In the present disclosure, the context information is dynamic and varies depending on time, location, contents of the dialogue, and other elements.

The AI processor 74 may further include a context fusion and learning module 91, a local knowledge 92, and a dialogue management 93.

The context fusion and learning module 91 may learn a user's intent based on at least one data. The at least one data may further include at least one sensing data obtained by a client device or a cloud environment. In addition, the at least one data may further include speaker identification, acoustic event detection, a speaker's personal information (gender and age detection), voice activity detection (VAD), and emotion classification information.

The speaker identification may indicate specifying a speaker in a speaker group registered by a speech. The speaker identification may include identifying a pre-registered speaker or registering a new speaker. The acoustic event detection may outdo a voice recognition technique and may be used to recognize acoustics itself to recognize a type of sound and a place where the sound occurs. The VAD is a speech processing technique of detecting presence or absence of a human speech (voice) from an audio signal that can include music, noise, or any other sound. According to an embodiment, the AI processor 74 may detect presence of a speech from the input audio signal. According to an embodiment the AI processor 74 differentiates a speech data and a non-speech data using a deep neural networks (DNN) model. In addition, the AI processor 74 may perform emotion classification information on the speech data using the DNN model. According to the emotion classification information, the speech data may be classified as anger, boredom, fear, happiness, or sadness.

The contest fusion and learning module 91 may include a DNN model to perform the above-described operation, and may determine intent of a user input based on sensing information collected in the DNN model, the client device or the cloud environment.

The at least one data is merely an example and may include any data that can be referred to so as to determine intent of a user in a speech processing procedure. The at least one data may be obtained through the above-described DNN model.

The AI processor 74 may include the local knowledge 92. The local knowledge 92 may include user data. The user data may include a user's preference, the user's address, the user's initially set language, the user's contact list, etc. According to an embodiment, the AI processor 74 may additionally define the user's intent by complementing information included in the user's speech input using the user's specific information. For example, in response to the user's request "Invite my friends to my birthday party", the AI processor 74 does not request more clarified information from the user and may utilize the local knowledge 92 to determine who "the friends" are and when and where the "birthday" takes place.

The AI processor 74 may further include the dialogue management 93. The AI processor 74 may provide a dialogue interface to enable speech conversation with the user. The dialogue interface may refer to a procedure of outputting a response to the user's speech input through a display or a speaker. Here, a final result output through the dialogue interface may be based on the ASR operation, the NLU operation, and the TTS operation, which are described above.

FIG. 10 is a perspective view of a VR electronic device according to one embodiment of the present invention, and FIG. 11 illustrates a situation in which the VR electronic device of FIG. 10 is used.

Referring to the figures, a VR electronic device may include a box-type electronic device 30 mounted on the head of the user and a controller 40 (40a, 40b) that the user may grip and manipulate.

The electronic device 30 includes a head unit 31 worn and supported on the head and a display unit 32 being combined with the head unit 31 and displaying a virtual image or video in front of the user's eyes. Although the figure shows that the head unit 31 and display unit 32 are made as separate units and combined together, the display unit 32 may also be formed being integrated into the head unit 31.

The head unit 31 may assume a structure of enclosing the head of the user so as to disperse the weight of the display unit 32. And to accommodate different head sizes of users, the head unit 31 may provide a band of variable length.

The display unit 32 includes a cover unit 32a combined with the head unit 31 and a display unit 32b containing a display panel.

The cover unit 32a is also called a goggle frame and may have the shape of a tub as a whole. The cover unit 32a has a space formed therein, and an opening is formed at the front surface of the cover unit, the position of which corresponds to the eyeballs of the user.

The display unit 32b is installed on the front surface frame of the cover unit 32a and disposed at the position corresponding to the eyes of the user to display screen information (image or video). The screen information output on the display unit 32b includes not only VR content but also external images collected through an image capture means such as a camera.

And VR content displayed on the display unit 32b may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display unit 32b. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display unit 32b.

The display unit 32b may include a display panel installed at the front of the opening of the cover unit 32a, where the display panel may be an LCD or OLED panel. Similarly, the display unit 32b may be a display unit of a smartphone. In other words, the display unit 32b may have a specific structure in which a smartphone may be attached to or detached from the front of the cover unit 32a.

And an image capture means and various types of sensors may be installed at the front of the display unit 32.

The image capture means (for example, camera) is formed to capture (receive or input) the image of the front and may obtain a real world as seen by the user as an image. One image capture means may be installed at the center of the display unit 32b, or two or more of them may be installed at symmetric positions. When a plurality of image capture means are installed, a stereoscopic image may be obtained. An image combining an external image obtained from an image capture means with a virtual image may be displayed through the display unit 32b.

Various types of sensors may include a gyroscope sensor, motion sensor, or IR sensor. Various types of sensors will be described in more detail later.

At the rear of the display unit 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40a, 40b) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display unit 32*b* in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50*a*, 50*b*) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present invention. For example, an input device installed in the electronic device 30 may replace the controller 40, and position information may be determined by itself from various sensors installed in the electronic device 30.

FIG. 12 is a perspective view of an AR electronic device according to one embodiment of the present invention.

As shown in FIG. 12, the electronic device according to one embodiment of the present invention may include a frame 100, controller 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present invention is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the controller 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 12, the electronic device may operate so that if the controller 200 projects light about an image onto one side of the display unit 300, the light is emitted to the other side of the display unit, and the image generated by the controller 200 is shown to the user.

Accordingly, the user may see the image generated by the controller 200 while seeing the external environment simultaneously through the opening of the frame 100. In other words, the image output through the display unit 300 may be seen by being overlapped with a normal view. By using the display characteristic described above, the electronic device may provide an AR experience which shows a virtual image overlapped with a real image or background as a single, interwoven image.

FIG. 13 is an exploded perspective view of a controller according to one embodiment of the present invention.

Referring to the figure, the controller 200 may include a first cover 207 and second cover 225 for protecting internal constituting elements and forming the external appearance of the controller 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the controller 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display unit 300.

The display unit 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display unit 300 and various methods for emitting incident image light rays will be described.

FIGS. 14 to 20 illustrate various display methods applicable to the display unit 300 according to one embodiment of the present invention.

More specifically, FIG. 14 illustrates one embodiment of a prism-type optical element; FIG. 15 illustrates one embodiment of a waveguide-type optical element; FIGS. 16 and 17 illustrate one embodiment of a pin mirror-type optical element; and FIG. 18 illustrates one embodiment of a surface reflection-type optical element. And FIG. 19 illustrates one embodiment of a micro-LED type optical element, and FIG. 20 illustrates one embodiment of a display unit used for contact lenses.

As shown in FIG. 14, the display unit 300-1 according to one embodiment of the present invention may use a prism-type optical element.

In one embodiment, as shown in FIG. 14(a), a prism-type optical element may use a flat-type glass optical element where the surface 300a on which image light rays are incident and from which the image light rays are emitted is planar or as shown in FIG. 14(b), may use a freeform glass optical element where the surface 300b from which the image light rays are emitted is formed by a curved surface without a fixed radius of curvature.

The flat-type glass optical element may receive the image light generated by the controller 200 through the flat side surface, reflect the received image light by using the total reflection mirror 300a installed inside and emit the reflected image light toward the user. Here, laser is used to form the total reflection mirror 300a installed inside the flat type glass optical element.

The freeform glass optical element is formed so that its thickness becomes thinner as it moves away from the surface on which light is incident, receives image light generated by the controller 200 through a side surface having a finite radius of curvature, totally reflects the received image light, and emits the reflected light toward the user.

As shown in FIG. 15, the display unit 300-2 according to another embodiment of the present invention may use a waveguide-type optical element or light guide optical element (LOE).

As one embodiment, the waveguide or light guide-type optical element may be implemented by using a segmented beam splitter-type glass optical element as shown in FIG. 15(a), saw tooth prism-type glass optical element as shown in FIG. 15(b), glass optical element having a diffractive optical element (DOE) as shown in FIG. 15(c), glass optical element having a hologram optical element (HOE) as shown in FIG. 15(d), glass optical element having a passive grating as shown in FIG. 15(e), and glass optical element having an active grating as shown in FIG. 15(f).

As shown in FIG. 15(a), the segmented beam splitter-type glass optical element may have a total reflection mirror 301a where an optical image is incident and a segmented beam splitter 301b where an optical image is emitted.

Accordingly, the optical image generated by the controller 200 is totally reflected by the total reflection mirror 301a inside the glass optical element, and the totally reflected optical image is partially separated and emitted by the partial reflection mirror 301b and eventually perceived by the user while being guided along the longitudinal direction of the glass.

In the case of the saw tooth prism-type glass optical element as shown in FIG. 15(b), the optical image generated by the controller 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 15(c) may have a first diffraction unit 303a on the surface of the part on which the optical image is incident and a second diffraction unit 303b on the surface of the part from which the optical image is emitted. The first and second diffraction units 303a, 303b may be provided in a way that a specific pattern is patterned on the surface of the glass or a separate diffraction film is attached thereon.

Accordingly, the optical image generated by the controller 200 is diffracted as it is incident through the first diffraction unit 303a, guided along the longitudinal direction of the glass while being totally reflected, emitted through the second diffraction unit 303b, and eventually perceived by the user.

The glass optical element having a Hologram Optical Element (HOE) as shown in FIG. 15(d) may have an out-coupler 304 inside the glass from which an optical image is emitted. Accordingly, the optical image is incoming from the controller 200 in the oblique direction through the side surface of the glass, guided along the longitudinal direction of the glass by being totally reflected, emitted by the out-coupler 304, and eventually perceived by the user. The structure of the HOE may be modified gradually to be further divided into the structure having a passive grating and the structure having an active grating.

The glass optical element having a passive grating as shown in FIG. 15(e) may have an in-coupler 305a on the opposite surface of the glass surface on which the optical image is incident and an out-coupler 305b on the opposite surface of the glass surface from which the optical image is emitted. Here, the in-coupler 305a and the out-coupler 305b may be provided in the form of film having a passive grating.

Accordingly, the optical image incident on the glass surface at the light-incident side of the glass is totally reflected by the in-coupler 305a installed on the opposite surface, guided along the longitudinal direction of the glass, emitted through the opposite surface of the glass by the out-coupler 305b, and eventually perceived by the user.

The glass optical element having an active grating as shown in FIG. 15(f) may have an in-coupler 306a formed as an active grating inside the glass through which an optical image is incoming and an out-coupler 306b formed as an active grating inside the glass from which the optical image is emitted.

Accordingly, the optical image incident on the glass is totally reflected by the in-coupler 306a, guided in the longitudinal direction of the glass, emitted to the outside of the glass by the out-coupler 306b, and eventually perceived by the user.

The display unit 300-3 according to another embodiment of the present invention may use a pin mirror-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole deepens the depth of field (DOF), which makes the image formed on the retina more vivid.

In what follows, an embodiment for using a pin mirror-type optical element will be described with reference to FIGS. 16 and 17.

Referring to FIG. 16(a), the pinhole mirror 310a may be provided on the path of incident light within the display unit 300-3 and reflect the incident light toward the user's eye. More specifically, the pinhole mirror 310a may be disposed between the front surface (outer surface) and the rear surface (inner surface) of the display unit 300-3, and a method for manufacturing the pinhole mirror will be described again later.

The pinhole mirror 310a may be formed to be smaller than the pupil of the eye and to provide a deep depth of field. Therefore, even if the focal length for viewing a real world through the display unit 300-3 is changed, the user may still clearly see the real world by overlapping an augmented reality image provided by the controller 200 with the image of the real world.

And the display unit 300-3 may provide a path which guides the incident light to the pinhole mirror 310a through internal total reflection.

Referring to FIG. 16(b), the pinhole mirror 310b may be provided on the surface 300c through which light is totally reflected in the display unit 300-3. Here, the pinhole mirror 310b may have the characteristic of a prism that changes the path of external light according to the user's eyes. For example, the pinhole mirror 310b may be fabricated as film-type and attached to the display unit 300-3, in which case the process for manufacturing the pinhole mirror is made easy.

The display unit 300-3 may guide the incident light incoming from the controller 200 through internal total reflection, the light incident by total reflection may be reflected by the pinhole mirror 310b installed on the surface on which external light is incident, and the reflected light may pass through the display unit 300-3 to reach the user's eyes.

Referring to FIG. 16(c), the incident light illuminated by the controller 200 may be reflected by the pinhole mirror 310c directly without internal total reflection within the display unit 300-3 and reach the user's eyes. This structure is convenient for the manufacturing process in that augmented reality may be provided irrespective of the shape of the surface through which external light passes within the display unit 300-3.

Referring to FIG. 16(d), the light illuminated by the controller 200 may reach the user's eyes by being reflected within the display unit 300-3 by the pinhole mirror 310d installed on the surface 300d from which external light is emitted. The controller 200 is configured to illuminate light at the position separated from the surface of the display unit 300-3 in the direction of the rear surface and illuminate light toward the surface 300d from which external light is emitted within the display unit 300-3. The present embodiment may be applied easily when thickness of the display unit 300-3 is not sufficient to accommodate the light illuminated by the controller 200. Also, the present embodiment may be advantageous for manufacturing in that it may be applied irrespective of the surface shape of the display unit 300-3, and the pinhole mirror 310d may be manufactured in a film shape.

Meanwhile, the pinhole mirror 310 may be provided in plural numbers in an array pattern.

FIG. 17 illustrates the shape of a pinhole mirror and structure of an array pattern according to one embodiment of the present invention.

Referring to the figure, the pinhole mirror 310 may be fabricated in a polygonal structure including a square or rectangular shape. Here, the length (diagonal length) of a longer axis of the pinhole mirror 310 may have a positive square root of the product of the focal length and wavelength of light illuminated in the display unit 300-3.

A plurality of pinhole mirrors 310 are disposed in parallel, being separated from each other, to form an array pattern. The array pattern may form a line pattern or lattice pattern.

FIGS. 17(a) and (b) illustrate the Flat Pin Mirror scheme, and FIGS. 17(c) and (d) illustrate the freeform Pin Mirror scheme.

When the pinhole mirror 310 is installed inside the display unit 300-3, the first glass 300e and the second glass 300f are combined by an inclined surface 300g disposed being inclined toward the pupil of the eye, and a plurality of pinhole mirrors 310e are disposed on the inclined surface 300g by forming an array pattern.

Referring to FIGS. 17(a) and (b), a plurality of pinhole mirrors 310e may be disposed side by side along one direction on the inclined surface 300g and continuously display the augmented reality provided by the controller 200 on the image of a real world seen through the display unit 300-3 even if the user moves the pupil of the eye.

And referring to FIGS. 17(c) and (d), the plurality of pinhole mirrors 310f may form a radial array on the inclined surface 300g provided as a curved surface.

Since the plurality of pinhole mirrors 300f are disposed along the radial array, the pinhole mirror 310f at the edge in the figure is disposed at the highest position, and the pinhole mirror 310f in the middle thereof is disposed at the lowest position, the path of a beam emitted by the controller 200 may be matched to each pinhole mirror.

As described above, by disposing a plurality of pinhole arrays 310f along the radial array, the double image problem of augmented reality provided by the controller 200 due to the path difference of light may be resolved.

Similarly, lenses may be attached on the rear surface of the display unit 300-3 to compensate for the path difference of the light reflected from the plurality of pinhole mirrors 310e disposed side by side in a row.

The surface reflection-type optical element that may be applied to the display unit 300-4 according to another embodiment of the present invention may employ the freeform combiner method as shown in FIG. 18(a), Flat HOE method as shown in FIG. 18(b), and freeform HOE method as shown in FIG. 18(c).

The surface reflection-type optical element based on the freeform combiner method as shown in FIG. 18(a) may use freeform combiner glass 300, for which a plurality of flat surfaces having different incidence angles for an optical image are combined to form one glass with a curved surface as a whole to perform the role of a combiner. The freeform combiner glass 300 emits an optical image to the user by making incidence angle of the optical image differ in the respective areas.

The surface reflection-type optical element based on Flat HOE method as shown in FIG. 18(b) may have a hologram optical element (HOE) 311 coated or patterned on the surface of flat glass, where an optical image emitted by the controller 200 passes through the HOE 311, reflects from the surface of the glass, again passes through the HOE 311, and is eventually emitted to the user.

The surface reflection-type optical element based on the freeform HOE method as shown in FIG. 18(c) may have a HOE 313 coated or patterned on the surface of freeform glass, where the operating principles may be the same as described with reference to FIG. 18(b).

In addition, a display unit 300-5 employing micro LED as shown in FIG. 19 and a display unit 300-6 employing a contact lens as shown in FIG. 20 may also be used.

Referring to FIG. 19, the optical element of the display unit 300-5 may include a Liquid Crystal on Silicon (LCoS) element, Liquid Crystal Display (LCD) element, Organic Light Emitting Diode (OLED) display element, and Digital Micromirror Device (DMD); and the optical element may further include a next-generation display element such as Micro LED and Quantum Dot (QD) LED.

The image data generated by the controller 200 to correspond to the augmented reality image is transmitted to the display unit 300-5 along a conductive input line 316, and the display unit 300-5 may convert the image signal to light through a plurality of optical elements 314 (for example, microLED) and emits the converted light to the user's eye.

The plurality of optical elements 314 are disposed in a lattice structure (for example, 100×100) to form a display area 314a. The user may see the augmented reality through the display area 314a within the display unit 300-5. And the plurality of optical elements 314 may be disposed on a transparent substrate.

The image signal generated by the controller 200 is sent to an image split circuit 315 provided at one side of the display unit 300-5; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 20, the display unit 300-5 may comprise a contact lens. A contact lens 300-5 on which augmented reality may be displayed is also called a smart contact lens. The smart contact lens 300-5 may have a plurality of optical elements 317 in a lattice structure at the center of the smart contact lens.

The smart contact lens 300-5 may include a solar cell 318a, battery 318b, controller 200, antenna 318c, and sensor 318d in addition to the optical element 317. For example, the sensor 318d may check the blood sugar level in the tear, and the controller 200 may process the signal of the sensor 318d and display the blood sugar level in the form of augmented reality through the optical element 317 so that the user may check the blood sugar level in real-time.

As described above, the display unit 300 according to one embodiment of the present invention may be implemented by using one of the prism-type optical element, waveguide-type optical element, light guide optical element (LOE), pin mirror-type optical element, or surface reflection-type optical element. In addition to the above, an optical element that may be applied to the display unit 300 according to one embodiment of the present invention may include a retina scan method.

FIG. 21 is a flowchart showing an intelligent voice recognition method of a voice recognition apparatus according to an embodiment of the present invention.

As shown in FIG. 21, the processor 170 of the voice recognition apparatus 10 can perform a voice recognition method through step S100 (S110, S130 and S150) of FIG. 21, which will be described in detail below.

First, the processor 170 can obtain a microphone detection signal including noise through one microphone (e.g., the sensing unit 150) (S110).

Subsequently, the processor 170 can detect a microphone detection signal including only a voice from which noise has been removed (S130).

For example, the processor 170 can remove noise from the microphone detection signal through Weibull likelihood and STFT processing and detect a microphone detection signal including only a voice separated from the noise.

Thereafter, the processor 170 can output a response TTS on the basis of a voice recognition result (S150).

FIG. 22 is a diagram illustrating an intelligent voice recognition process according to an embodiment of the present invention.

As shown in FIG. 22, the voice recognition apparatus 10 can recognize a microphone detection signal including noise and a voice through a microphone 50 included therein or an external device.

Subsequently, the voice recognition apparatus 10 can output a microphone detection signal recognition result to the other party 90 (e.g., another device connected to the voice recognition apparatus 10 through communication).

FIG. 23 is a diagram illustrating a voice recognition system according to an embodiment of the present invention.

As shown in FIG. 23, the voice recognition apparatus 10 can be connected to a wireless earphone 50 as an example of an external device through wireless communication 80. Here, wireless communication 80 may include Bluetooth communication. For example, Bluetooth communication can be provided to the voice recognition apparatus 10 and the wireless earphone 50 through the 5G network described with reference to FIGS. 1 to 3.

The wireless earphone 50 can detect a voice 60 of a user and noise 70. The wireless earphone 50 can transmit a microphone detection signal including the detected user's voice 60 and the noise 70 to the voice recognition apparatus 10 through wireless communication 80. In this case, the voice recognition apparatus 10 can request the microphone detection signal from the wireless earphone 50 through wireless communication 80 and obtain the microphone detection signal from the wireless earphone 50 as a response to the request through wireless communication 80.

The voice recognition apparatus 10 can recognize the microphone detection signal and transmit a microphone detection signal including only the voice 60 obtained by removing the noise 70 from the microphone detection signal to an external device (e.g., a mobile terminal) 90. Here, the voice recognition apparatus 10 can be connected to the external device 90 through the 5G network described with reference to FIGS. 1 to 3 and transmit the microphone detection signal including only the voice 60 obtained by removing the noise 70 from the microphone detection signal to the external device 90 through the 5G network.

FIG. 24 is a flowchart showing the microphone detection signal acquisition process of FIG. 21.

As shown in FIG. 24, the processor 170 can control the communication unit 110 to receive a UL grant from a network (S111).

Here, the UL grant can include information related to the number of repetitions of transmission and information related to frequency hopping set based on the number of repetitions of transmission which are necessary for the processor 170 to transmit a request signal for requesting a microphone detection signal to the 5G network.

Subsequently, the processor 170 can control the communication unit 110 to request a microphone detection signal from the wireless earphone 50 through the 5G network on the basis of the information related to the number of repetitions of transmission and the information related to frequency hopping set based on the number of repetitions of transmission included in the UL grant (S113).

Finally, the processor 170 can control the communication unit 110 to receive the microphone detection signal from the wireless earphone 50 through the 5G network (S115).

FIG. 25 is a flowchart illustrating the response output process of FIG. 21.

Here, the voice recognition apparatus 10 may be a first mobile terminal and an external device communicating with the voice recognition apparatus 10 may be called a second mobile terminal.

As shown in FIG. 25, the processor 170 can control the communication unit 110 to receive resource allocation information for call connection with the second mobile terminal from a network through a PDCCH (S151).

Subsequently, the processor can control the communication unit 110 to transmit a microphone detection signal including only a voice from which noise has been removed to the second mobile terminal on the basis of the resource allocation information (S153).

FIG. 26 illustrates a process in which a virtual reality (VR) device transmits a microphone detection signal including a voice from which noise has been removed to an external device.

As shown in FIG. 26, the voice recognition apparatus may include a VR device 30.

For example, the VR device 30 can simultaneously detect a voice 60 of a user and noise 70.

Subsequently, the VR device 30 can recognize a microphone detection signal including only the voice 60 from which the noise 70 has been removed from the microphone detection signal including the user's voice 60 and the noise 70.

Then, the VR device 30 can transmit the microphone detection signal including only the voice 60 from which the noise 70 has been removed to the second mobile terminal (external device) 90.

FIG. 27 illustrates a process in which an augmented reality (AR) device transmits a microphone detection signal including a voice from which noise has been removed to an external device.

As shown in FIG. 27, the voice recognition apparatus may include an AR device 100.

For example, the AR device 100 can simultaneously detect a voice 60 of a user and noise 70 through an audio output unit 140.

Subsequently, the AR device 100 can recognize a microphone detection signal including only the voice 60 from which the noise 70 has been removed from the microphone detection signal including the user's voice 60 and the noise 70.

Then, the AR device 100 can transmit the microphone detection signal including only the voice 60 from which the noise 70 has been removed to the second mobile terminal (external device) 90.

FIG. 28 illustrates the process of recognizing a microphone detection signal including only a voice from which noise has been removed of FIG. 21.

As shown in FIG. 28, when noise and a voice are detected through the microphone 50, the microphone 50 can transmit a microphone detection signal including the noise and the voice to the processor 170 of the voice recognition apparatus 10.

The processor 170 can extract a feature vector from the microphone detection signal including the noise and the voice using a Weibull likelihood & Short Time Fourier Transform (STFT) module 171 included in the processor 170.

Subsequently, the processor 170 can input the feature vector extracted using the Weibull likelihood & STFT module 171 included therein to an artificial neural network 172 learned in advance.

FIG. 29 is a flowchart showing a process of recognizing a microphone detection signal using the artificial neural network of FIG. 28.

As shown in FIG. 29, the processor 170 can extract a feature value (or feature vector) from a microphone detection signal using the above-described Weibull likelihood & Short Time Fourier Transform (STFT) module 171 (S131).

Subsequently, the processor 170 can input the extracted feature value to the previously learned artificial neural network 171 (S132).

Here, the artificial neural network 171 can be learned in advance using a training set having a microphone detection signal as an input set and having a user's voice as an output set. Particularly, the artificial neural network 171 can be learned using the training set such that it can receive a microphone detection signal including noise and a voice and output only the voice.

Next, the processor 170 can obtain a microphone detection signal including a voice from which noise has been removed as an output of the artificial neural network (S133).

Subsequently, the processor 170 can recognize the voice on the basis of the microphone detection signal (S134).

Finally, the processor 170 can output a response that is a voice recognition result (S135).

FIG. 30 is a flowchart showing a process of performing steps S131 to S133 of FIG. 29 using AI processing of a 5G network.

First, the voice recognition apparatus 10 or the processor 170 thereof can control the communication unit 110 to transmit feature values extracted from a microphone detection signal to an AI processor included in the 5G network. Further, the processor 170 can control the communication unit to receive AI-processed information from the AI processor.

The AI-processed information can include a microphone detection signal including only a voice from which noise has been removed.

The processor 170 can perform an initial access procedure with the 5G network in order to transmit the microphone detection signal to the 5G network. The processor 170 can perform the initial access procedure with the 5G network on the basis of a synchronization signal block (SSB).

Further, the processor 170 can receive downlink control information (DCI) used to schedule transmission of the microphone detection signal from the network through a wireless communication unit.

The processor 170 can transmit the microphone detection signal to the network on the basis of the DCI.

The processor 170 can transmit the microphone detection signal to the network over a PUSCH, and the aforementioned SSB and a DM-RS of the PUSCH can be QCLed for QCL type D.

Hereinafter, a processor S130 of removing noise from a microphone detection signal and separating only a voice therefrom through a network will be described in detail.

The voice recognition apparatus 10 can transmit feature values extracted from the microphone detection signal to a 5G network (S3010).

Here, the 5G network can include an AI processor or an AI system.

Subsequently, the AI system of the 5G network can perform AI processing on the basis of the received microphone detection signal (S3020).

Hereinafter, the AI processing step S3020 will be described in detail.

First, the AI system can input feature values of the microphone detection signal received from the voice recognition apparatus 10 to an artificial neural network (ANN) or an ANN classifier (S3021).

The AI system can obtain a microphone detection signal including only a user's voice from which noise has been removed as an ANN output value (S3022). The 5G network can transmit the microphone detection signal including only the user's voice from which noise has been removed obtained in the AI system to the voice recognition apparatus 10 through a communication unit (S3030).

Meanwhile, the voice recognition apparatus 10 may transmit only the microphone detection signal to the 5G network and the AI system included in the 5G network may extract feature values corresponding to input to be used as input of an ANN for determining a microphone detection signal including only a user's voice from which noise has been removed from the microphone detection signal.

J. SUMMARY OF EMBODIMENTS

Embodiment 1: an intelligent voice recognition method of a voice recognition apparatus includes: obtaining a microphone detection signal; recognizing a voice of a user from the microphone detection signal; and outputting a response related to the voice on the basis of a result of recognition of the voice, wherein the microphone detection signal includes noise, and the recognizing of the voice includes recognizing a microphone detection signal including only the voice obtained by removing the noise from the microphone detection signal.

Embodiment 2: in embodiment 1, the obtaining of the microphone detection signal includes obtaining the microphone detection signal from a wireless earphone for detecting external signals, and the recognizing of the voice includes removing ambient noise of the wireless earphone from the microphone detection signal.

Embodiment 3: in embodiment 2, the obtaining of the microphone detection signal from the wireless earphone includes receiving a UL grant from a network, requesting the microphone detection signal from the wireless earphone using frequency hopping set on the basis of the number of repetitions of transmission included in the UL grant, and obtaining the microphone detection signal in response to the request.

Embodiment 4: in embodiment 1, the outputting of the response includes transmitting a microphone detection signal including only the voice obtained by removing the noise from the microphone detection signal to an external device connected to the voice recognition apparatus for a call.

Embodiment 5: in embodiment 4, the outputting of the response includes receiving resource allocation information for call connection with the external device from a network through a physical uplink control channel, and transmitting the microphone detection signal including only the voice from which the noise has been removed to the external device on the basis of the resource allocation information.

Embodiment 6: in embodiment 1, the voice recognition apparatus includes a virtual reality device or an augmented reality device, and the recognizing of the voice includes removing ambient noise of a head unit of the virtual reality device or the augmented reality device from the microphone detection signal.

Embodiment 7: in embodiment 1, the recognizing of the voice includes inputting the microphone detection signal to an artificial neural network learned in advance, and obtaining the microphone detection signal including only the voice from which the noise has been removed as an output of the artificial neural network, wherein the artificial neural network is learned in advance on the basis of a training set including prestored sound signals and the voice of the user.

Embodiment 8: in embodiment 7, the intelligent voice recognition method further includes receiving downlink control information (DCI) used to schedule transmission of the microphone detection signal obtained from at least one sensor included in the voice recognition apparatus from a network, and transmitting the microphone detection signal to the network on the basis of the DCI.

Embodiment 9: in embodiment 8, the intelligent voice recognition method further includes performing an initial access procedure with the network on the basis of a synchronization signal block (SSB), and transmitting the microphone detection signal to the network through a PUSCH, wherein the SSB and a DM-RS of the PUSCH are QCLed for QCL type D.

Embodiment 10: in embodiment 9, the intelligent voice recognition method further includes controlling a communication unit to transmit the microphone detection signal to an AI processor included in the network, and controlling the communication unit to receive AI-processed information from the AI processor, wherein the AI-processed information is a microphone detection signal including only the voice from which the noise has been removed.

Embodiment 11: an intelligent voice recognition apparatus includes: a microphone for detecting external signals; a speaker for outputting sound to the outside; and a processor configured to obtain a microphone detection signal through the microphone, to recognize a voice of a user from the microphone detection signal, and to output a response related to the voice through the speaker on the basis of a result of recognition of the voice, wherein the microphone detection signal includes noise, and the processor recognizes a microphone detection signal including only the voice obtained by removing the noise from the microphone detection signal.

Embodiment 12: in embodiment 11, the processor obtains the microphone detection signal from a wireless earphone for detecting external signals and removes ambient noise of the wireless earphone from the microphone detection signal.

Embodiment 13: in embodiment 12, the voice recognition apparatus is a first mobile terminal including a communication unit, and the processor transmits a microphone detection signal including only the voice obtained by removing the noise from the microphone detection signal to a second mobile terminal connected to the first mobile terminal for a cell through the communication unit.

Embodiment 14: in embodiment 11, the voice recognition apparatus is a virtual reality device or an augmented reality device, and the processor removes ambient noise of a head unit of the virtual reality device or the augmented reality device from the microphone detection signal.

Embodiment 15: in embodiment 14, the processor inputs the microphone detection signal to an artificial neural network learned in advance and obtains the microphone detection signal including only the voice from which the noise has been removed as an output of the artificial neural network, wherein the artificial neural network is learned in advance on the basis of a training set including prestored sound signals and the voice of the user.

Embodiment 16: in embodiment 11, the artificial neural network is learned through a supervised learning method by setting the prestored signals as input values and setting the voice of the user as an output value.

Embodiment 17: in embodiment 11, the processor separates the microphone detection signal into the voice of the user and the noise in the time domain and the frequency domain, extracts feature vectors from the voice of the user and the noise and inputs the feature vectors to the artificial neural network.

Embodiment 18: in embodiment 17, the processor receives downlink control information (DCI) used to schedule transmission of the microphone detection signal obtained from an input unit included in the voice recognition apparatus from a network through the communication unit and transmits the microphone detection signal to the network on the basis of the DCI.

Embodiment 19: in embodiment 18, the processor performs an initial access procedure with the network on the basis of a synchronization signal block (SSB) through the communication unit and transmits the microphone detection signal to the network over a PUSCH through the communication unit, wherein the SSB and a DM-RS of the PUSCH are QCLed for QCL type D.

Embodiment 20: in embodiment 19, the processor controls the communication unit to transmit the microphone detection signal to an AI processor included in the network and controls the communication unit to receive AI-processed information from the AI processor, wherein the AI-processed information is a microphone detection signal including only the voice from which the noise has been removed.

Embodiment 21: a non-transitory computer-readable recording medium stores a computer-executable component configured to be executed in one or more processor of a computing device, and the computer-executable component obtains a microphone detection signal, recognizes a voice of a user from the microphone detection signal and outputs a response related to the voice on the basis of a result of recognition of the voice, wherein the microphone detection signal includes noise, and a microphone detection signal including only the voice obtained by removing the noise from the microphone detection signal is recognized.

Particular embodiments or other embodiments of the present invention described above are not mutually exclusive to each other or distinguishable from each other. Individual structures or functions of particular embodiments or other embodiments of the present invention described above may be used in parallel therewith or in combination thereof.

For example, it means that structure A described with reference to a specific embodiment and/or figure and structure B described with reference to other embodiment and/or figure may be combined together. In other words, even if a combination of two different structures is not explicitly indicated, it should be understood that combination thereof is possible unless otherwise stated as impossible.

The detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

The effects of the intelligent voice recognition method, voice recognition apparatus and intelligent computing device according to an embodiment of the present invention are as follows.

The present invention can effectively separate only a voice of a user from a microphone detection signal detected through a microphone of the voice recognition apparatus.

Further, the present invention can clearly distinguish noise from a voice in a microphone detection signal and remove the noise therefrom.

Effects which can be achieved by the present invention are not limited to the above-mentioned effects. That is, other objects that are not mentioned may be obviously understood by those skilled in the art to which the present invention pertains from the following description.

What is claimed is:

1. An intelligent voice recognition method of a voice recognition apparatus, comprising:
   obtaining a microphone detection signal;
   recognizing a voice of a user from the microphone detection signal; and
   outputting a response related to the voice based on a result of recognition of the voice,
   wherein the microphone detection signal includes noise, and the recognizing of the voice comprises recognizing a microphone detection signal including only the voice obtained by removing the noise from the microphone detection signal, and
   wherein the obtaining of the microphone detection signal is obtained from a wireless earphone for detecting external signals and comprises:
   receiving an uplink (UL) grant from a network;
   requesting the microphone detection signal from the wireless earphone using frequency hopping set based on a number of repetitions of transmission included in the UL grant; and
   obtaining the microphone detection signal in response to the requesting the microphone detection signal.

2. The intelligent voice recognition method of claim 1, wherein the recognizing of the voice comprises removing ambient noise of the wireless earphone from the microphone detection signal.

3. The intelligent voice recognition method of claim 1, wherein the outputting of the response comprises transmitting a microphone detection signal including only the voice obtained by removing the noise from the microphone detection signal to an external device connected to the voice recognition apparatus for a call.

4. The intelligent voice recognition method of claim 1, wherein the outputting of the response comprises:
   receiving resource allocation information for call connection with an external device from a network through a physical uplink control channel; and
   transmitting the microphone detection signal including only the voice from which the noise has been removed to the external device based on the resource allocation information.

5. The intelligent voice recognition method of claim 1, wherein the voice recognition apparatus includes a virtual reality device or an augmented reality device,
   wherein the recognizing of the voice comprises removing ambient noise of a head module of the virtual reality device or the augmented reality device from the microphone detection signal.

6. The intelligent voice recognition method of claim 1, wherein the recognizing of the voice comprises:
   inputting the microphone detection signal to an artificial neural network learned in advance; and
   obtaining the microphone detection signal including only the voice from which the noise has been removed as an output of the artificial neural network,
   wherein the artificial neural network is learned in advance based on a training set including prestored sound signals and the voice of the user.

7. The intelligent voice recognition method of claim 6, further comprising:
   receiving downlink control information (DCI) used to schedule transmission of the microphone detection signal obtained from at least one sensor included in the voice recognition apparatus from a network; and
   transmitting the microphone detection signal to the network based on the DCI.

8. The intelligent voice recognition method of claim 7, further comprising:
- performing an initial access procedure with the network based on a synchronization signal block (SSB); and
- transmitting the microphone detection signal to the network through a PUSCH,
- wherein the SSB and a DM-RS of the PUSCH are QCLed for QCL type D.

9. The intelligent voice recognition method of claim 8, further comprising:
- controlling a communication module to transmit the microphone detection signal to an AI processor included in the network; and
- controlling the communication module to receive AI-processed information from the AI processor,
- wherein the AI-processed information is a microphone detection signal including only the voice from which the noise has been removed.

10. An intelligent voice recognition apparatus comprising:
- a microphone for detecting external signals;
- a speaker for outputting sound to the outside; and
- a processor configured to obtain a microphone detection signal through the microphone, to recognize a voice of a user from the microphone detection signal, and to output a response related to the voice through the speaker based on a result of recognition of the voice,
- wherein the microphone detection signal includes noise, and the processor recognizes a microphone detection signal including only the voice obtained by removing the noise from the microphone detection signal, and
- wherein the processor obtains the microphone detection signal from a wireless earphone for detecting external signals by:
- receiving a uplink (UL) grant from a network;
- requesting the microphone detection signal from the wireless earphone using frequency hopping set based on a number of repetitions of transmission included in the UL grant; and
- obtaining the microphone detection signal in response to the requesting the microphone detection signal.

11. The intelligent voice recognition apparatus of claim 10, wherein the processor removes ambient noise of the wireless earphone from the microphone detection signal.

12. The intelligent voice recognition apparatus of claim 11, wherein the voice recognition apparatus is a first mobile terminal including a communication module, and the processor transmits a microphone detection signal including only the voice obtained by removing the noise from the microphone detection signal to a second mobile terminal connected to the first mobile terminal for a call through the communication module.

13. The intelligent voice recognition apparatus of claim 10, wherein the voice recognition apparatus is a virtual reality device or an augmented reality device, and the processor removes ambient noise of a head module of the virtual reality device or the augmented reality device from the microphone detection signal.

14. The intelligent voice recognition apparatus of claim 10, wherein the processor inputs the microphone detection signal to an artificial neural network learned in advance and obtains the microphone detection signal including only the voice from which the noise has been removed as an output of the artificial neural network,
- wherein the artificial neural network is learned in advance based on a training set including prestored sound signals and the voice of the user.

15. The intelligent voice recognition apparatus of claim 14, wherein the artificial neural network is learned through a supervised learning method by setting the prestored sound signals as input values and setting the voice of the user as an output value.

16. The intelligent voice recognition apparatus of claim 15, wherein the processor separates the microphone detection signal into the voice of the user and the noise in the time domain and the frequency domain, extracts feature vectors from the voice of the user and the noise and inputs the feature vectors to the artificial neural network.

17. The intelligent voice recognition apparatus of claim 16, wherein the processor receives downlink control information MCI) used to schedule transmission of the microphone detection signal obtained from the microphone included in the voice recognition apparatus from a network through the communication module and transmits the microphone detection signal to the network based on the DCI.

18. The intelligent voice recognition apparatus of claim 17, wherein the processor performs an initial access procedure with the network based on a synchronization signal block (SSB) through the communication module and transmits the microphone detection signal to the network over a PUSCH through the communication module,
- wherein the SSB and a DM-RS of the PUSCH are QCLed for QCL type D.

19. The intelligent voice recognition apparatus of claim 18, wherein the processor controls the communication module to transmit the microphone detection signal to an AI processor included in the network and controls the communication module to receive AI-processed information from the AI processor,
- wherein the AI-processed information is a microphone detection signal including only the voice from which the noise has been removed.

20. A non-transitory computer-readable recording medium storing a computer-executable component configured to be executed in one or more processors of a computing device, the computer-executable component being configured to:
- obtain a microphone detection signal;
- recognize a voice of a user from the microphone detection signal; and
- output a response related to the voice based on a result of recognition of the voice,
- wherein the microphone detection signal includes noise, and a microphone detection signal including only the voice obtained by removing the noise from the microphone detection signal is recognized, and
- wherein the microphone detection signal is obtained from a wireless earphone for detecting external signals by:
- receiving an uplink (UL) grant from a network;
- requesting the microphone detection signal from the wireless earphone using frequency hopping set based on a number of repetitions of transmission included in the UL grant; and
- obtaining the microphone detection signal in response to the requesting the microphone detection signal.

* * * * *